(12) United States Patent
Kuriyama

(10) Patent No.: US 7,646,589 B2
(45) Date of Patent: Jan. 12, 2010

(54) SOLID ELECTROLYTIC CAPACITOR WITH FIRST AND SECOND ANODE WIRES

(75) Inventor: Chojiro Kuriyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 543 days.

(21) Appl. No.: 10/588,625

(22) PCT Filed: Feb. 3, 2005

(86) PCT No.: PCT/JP2005/001582

§ 371 (c)(1),
(2), (4) Date: Aug. 4, 2006

(87) PCT Pub. No.: WO2005/076298

PCT Pub. Date: Aug. 18, 2005

(65) Prior Publication Data

US 2009/0015988 A1    Jan. 15, 2009

(30) Foreign Application Priority Data

Feb. 5, 2004    (JP)    ............................. 2004-028981

(51) Int. Cl.
*H01G 9/04* (2006.01)
*H01G 9/145* (2006.01)
*H01G 9/00* (2006.01)
*H01G 4/228* (2006.01)

(52) U.S. Cl. ........................ 361/528; 361/523; 361/540

(58) Field of Classification Search ................ 361/528, 361/532, 535, 538, 540, 523
See application file for complete search history.

(56) References Cited

U.S. PATENT DOCUMENTS

| | | | |
|---|---|---|---|
| 5,184,287 A | * | 2/1993 | Taniguchi ................. 361/540 |
| 5,629,830 A | | 5/1997 | Yamagami et al. |
| 6,249,424 B1 | | 6/2001 | Nitoh et al. |
| 6,343,004 B1 | | 1/2002 | Kuranuki et al. |
| 6,392,869 B2 | | 5/2002 | Shiraishi et al. |
| 6,467,142 B1 | | 10/2002 | Shirashige et al. |
| 6,625,009 B2 | | 9/2003 | Maeda |
| 6,741,451 B2 | | 5/2004 | Aoyama |
| 6,751,086 B2 | | 6/2004 | Matsumoto |
| 6,816,358 B2 | | 11/2004 | Kida et al. |
| 6,836,401 B2 | | 12/2004 | Yoshida et al. |

(Continued)

FOREIGN PATENT DOCUMENTS

JP    52-31840    3/1977

(Continued)

OTHER PUBLICATIONS

Japanese Office Action from the corresponding JP 2004-028981, mailed May 22, 2007.

*Primary Examiner*—Eric Thomas
*Assistant Examiner*—David M Sinclair
(74) *Attorney, Agent, or Firm*—Hamre, Schumann, Mueller & Larson, P.C.

(57) ABSTRACT

A solid electrolytic capacitor (A1) includes a first and a second anode terminals (11a, 11b) projecting in different directions from each other. Preferably, a metal cover (22) for electrically connecting the anode terminals (11a, 11b) to each other is provided. With such an arrangement, the ESR and the ESL can be reduced, and the high frequency characteristics can be enhanced.

20 Claims, 24 Drawing Sheets

U.S. PATENT DOCUMENTS

| | | | |
|---|---|---|---|
| 6,873,518 B2 | 3/2005 | Masuda et al. | |
| 6,912,117 B2 | 6/2005 | Arai et al. | |
| 6,977,807 B2 * | 12/2005 | Arai et al. | 361/523 |
| 7,031,141 B2 * | 4/2006 | Kuriyama | 361/528 |
| 7,450,366 B2 * | 11/2008 | Kuriyama | 361/523 |
| 2003/0039093 A1 * | 2/2003 | Tadanobu et al. | 361/503 |
| 2003/0053286 A1 * | 3/2003 | Masuda et al. | 361/523 |
| 2003/0223180 A1 | 12/2003 | Aoyama | |
| 2004/0017645 A1 * | 1/2004 | Arai et al. | 361/302 |
| 2004/0021534 A1 * | 2/2004 | Arai et al. | 333/204 |
| 2004/0105218 A1 | 6/2004 | Masuda et al. | |
| 2005/0168920 A1 | 8/2005 | Arai et al. | |

FOREIGN PATENT DOCUMENTS

| | | | |
|---|---|---|---|
| JP | 58-30121 | | 2/1983 |
| JP | 60-41716 | | 12/1985 |
| JP | 3-89508 | | 4/1991 |
| JP | 4-55126 | | 5/1992 |
| JP | 11-288845 | | 10/1999 |
| JP | 2000-12387 | | 1/2000 |
| JP | 2001-6977 | | 1/2001 |
| JP | 2001-57319 | | 2/2001 |
| JP | 2003-101311 | | 4/2003 |
| JP | 2003-158042 | | 5/2003 |
| JP | 2003-163137 | | 6/2003 |
| JP | 2003264128 A | * | 9/2003 |
| JP | 2003-347163 | | 12/2003 |

* cited by examiner

PRIOR ART

PRIOR ART

SOLID ELECTROLYTIC CAPACITOR WITH FIRST AND SECOND ANODE WIRES

TECHNICAL FIELD

The present invention relates to a solid electrolytic capacitor which utilizes a porous sintered body of valve metal.

BACKGROUND ART

A solid electrolytic capacitor is used for canceling a noise generated from an electronic device such as a CPU, for example. Operation speed of CPUs has been improved to a large degree. With respect to a solid electrolytic capacitor, therefore, excellent noise cancellation performance for a wide frequency band including a high frequency band is demanded. A solid electrolytic capacitor is used also for assisting a power supply system for supplying power to an electronic device. In accordance with an increase in clock speed and digitalization of electronic devices, a solid electrolytic capacitor is demanded which is capable of realizing high power supply at high speed. To realize the high power supply, it is necessary that the capacitance is large and that the heat generation at the porous body is reduced.

The frequency characteristics of the impedance Z of a solid electrolytic capacitor is determined by the following formula 1.

$$Z = \sqrt{(R^2 + (1/\omega C - \omega L)^2)} \quad \text{[Formula 1]}$$

In the formula 1, ω represents angular velocity, which corresponds to 2π times the frequency. Further, C, R, and L represent the capacitance, the resistance, and the inductance of the solid electrolytic capacitor, respectively. As will be understood from the above formula, in a frequency band lower than the self-resonant frequency, $1/\omega C$ is the major determinant of the impedance Z. Therefore, the impedance can be decreased by increasing the capacitance C. In a high frequency band near the self-resonant frequency, the resistance R is the major determinant. Therefore, to decrease the impedance, the ESR (equivalent series resistance) needs to be decreased. Further, in an ultra high frequency range higher than the self-resonant frequency, ωL is the major determinant. Therefore, to decrease the impedance, the ESL (equivalent series inductance) needs to be decreased. The larger the volume of a porous sintered body is, the higher the ESL of the solid electrolytic capacitor is. Therefore, as the capacitance is increased, decreasing of the impedance in an ultra high frequency range becomes more difficult.

For instance, a solid electrolytic capacitor includes a porous sintered body of a valve metal such as tantalum or niobium and a plurality of anode terminals projecting out from the porous sintered body. (See Patent Document 1, for example) FIGS. 23 and 24 illustrate an example of such a solid electrolytic capacitor. The solid electrolytic capacitor B includes three anode wires 92 projecting from a porous sintered body 91, and the projecting portions serve as anode terminals 93. As shown in FIG. 24, the anode terminals 93 are electrically connected to each other via an anode conduction member 94. A cathode conduction member 95 is electrically connected to a solid electrolytic layer (not shown) formed on a surface of the porous sintered body 91 via a conductive resin layer 96 made of silver paste, for example. The conduction members 94, 95 are electrically connected to an external anode terminal and an external cathode terminal (not shown) for external connection, respectively. The solid electrolytic capacitor B is structured as a so-called two-terminal solid electrolytic capacitor. In the solid electrolytic capacitor B, the ESR is decreased by the provision of the three anode terminals 93.

However, as shown in FIG. 23, the three anode wires 92 extend into the porous sintered body 91 through the same surface of the sintered body in the same direction. In this figure, the maximum of the distances between portions of the conductive resin layer 96 and the anode wires 92 is indicated as the maximum distance b. In the solid electrolytic capacitor B, the maximum distance b is the distance between an anode wire 92 and the portion of the conductive resin layer 96 located at an end of the surface which is opposite from the surface through which the anode wires 92 extend. The larger the maximum distance B is, the higher the resistance and inductance between the anode terminals 93 and the conductive resin layer 96 is. Particularly, when the size of the porous sintered body 91 is increased to increase the capacitance or the porous sintered body 91 is made flat to decrease the ESL, the maximum distance b increases. In such a case, the ESR and the ESL cannot be decreased, so that the high frequency characteristics cannot be sufficiently enhanced. Moreover, when the size of the porous sintered body is increased to realize high power supply, the heat generation at the porous sintered body 91 is increased. Therefore, the heat dissipation performance needs to be enhanced.

Patent Document 1: JP-A-2001-57319 (FIGS. 2 and 3)

DISCLOSURE OF THE INVENTION

Problems to be Solved by the Invention

The present invention is conceived under the above-described circumstances. It is, therefore, an object of the present invention to provide a solid electrolytic capacitor which is capable of enhancing the high frequency characteristics by reducing the ESR and the ESL.

Means for Solving the Problems

To solve the above-described problems, the present invention takes the following technical measures.

According to the present invention, there is provided a solid electrolytic capacitor comprising a porous sintered body of valve metal; a first and a second anode wires partially extending into the porous sintered body, portions of the first and the second anode wires which project out from the porous sintered body serving as a first and a second anode terminals; and a cathode including a solid electrolytic layer formed on a surface of the porous sintered body. The first anode wire and the second anode wire extend into the porous sintered body in different directions from each other.

With such a structure, as compared with a structure in which the anode wires extend into the porous sintered body in the same direction, the maximum of the distances between each portion of the cathode and the anode wires (hereinafter referred to as "maximum distance") can be reduced. When the maximum distance is reduced, the resistance and the inductance between the cathode and the anode terminals can be reduced. Therefore, the ESR and ESL of the solid electrolytic capacitor can be reduced, which leads to the enhancement of the high frequency characteristics.

Preferably, the direction in which the first anode wire extends and the direction in which the second anode wire extends are opposite from each other. With such an arrangement, the maximum distance can be further reduced. Therefore, this arrangement is advantageous for reducing the ESR and ESL.

Preferably, the solid electrolytic capacitor further comprises a conductive member for electrically connecting the first and the second anode terminals to each other. With such a structure, the first and the second anode terminals can be electrically connected in parallel, which is advantageous for reducing the resistance. Further, when the solid electrolytic capacitor is structured as a so-called three-terminal or four-terminal capacitor, the conductive member can be utilized for forming a bypass current path for detouring the circuit current.

Preferably, the porous sintered body is flat. Such a structure is advantageous for reducing the ESL.

Preferably, the conductive member includes a metal cover covering at least part of the porous sintered body, and the solid electrolytic capacitor further comprises an insulating member interposed between the metal cover and the cathode.

With such a structure, the porous sintered body is protected by the metal cover. As compared with e.g. sealing resin as the means for protecting the porous sintered body, the metal cover has higher mechanical strength. Therefore, even when heat is generated at the porous sintered body, the solid electrolytic capacitor is prevented from unduly warping. Further, the metal cover is superior in thermal conductivity to the sealing resin. Therefore, the metal cover is suited to dissipate the heat generated at the porous sintered body and hence to enhance the allowable power loss of the solid electrolytic capacitor. Further, by changing the shape or thickness of the metal cover, the resistance and inductance of the metal cover can be adjusted. When the resistance and the inductance are reduced, the noise cancellation performance for a high frequency band and the responsiveness in power supply can be enhanced. In a structure in which a bypass current path for detouring a DC component of the circuit current is formed by the conductive member as will be described later, it is possible to selectively detour a DC component and properly causes an AC component to flow to the porous sintered body by increasing the inductance of the metal cover.

Preferably, the metal cover is formed with a plurality of holes. With such a structure, in a process step for forming an insulating member of resin between the metal cover and the cathode, the resin can be introduced by utilizing the plurality of holes. When a resin film is to be provided between the metal cover and the cathode, the adhesive for bonding the resin film to the metal cover can be applied into the holes. Therefore, the application amount of the adhesive is increased as compared with a structure in which holes are not formed. Therefore, the bonding strength between the resin film and the metal cover is increased. Further, the resistance and inductance of the metal cover can be adjusted by forming the holes at a portion of the metal cover where the current flows.

Preferably, the metal cover is formed with a slut. With such a structure again, the resistance and inductance of the metal cover can be adjusted.

Preferably, the metal cover is formed with a bent portion. With such a structure again, the inductance of the metal cover can be adjusted.

Preferably, the solid electrolytic capacitor further comprises an external anode terminal for surface mounting which is electrically connected to the first and the second anode terminals, and an external cathode terminal for surface mounting which is electrically connected to the cathode. With such a structure, the surface mounting of the solid electrolytic capacitor can be easily performed by utilizing the external anode terminal and the external cathode terminal.

Preferably, the conductive member includes an anode metal plate, and the solid electrolytic capacitor further comprises an insulating member interposed between the anode metal plate and the cathode. With such a structure, the anode metal plate can be made as a flat plate without a stepped portion, and the inductance between the first and the second anode terminals can be reduced.

Preferably, at least part of the anode metal plate serves as an external anode terminal for surface mounting. With such a structure, the distance between the substrate to which the solid electrolytic capacitor is mounted and the anode metal plate, for example, can be reduced. Therefore, the current path between the substrate and the anode metal plate is shortened, whereby the inductance can be reduced.

Preferably, the anode metal plate is formed with a slit. With such a structure, the inductance of the anode metal plate can be adjusted.

Preferably, the solid electrolytic capacitor further comprises a cathode metal plate electrically connected to the cathode and interposed between the cathode and the insulating member. With such a structure, in the process of manufacturing the solid electrolytic capacitor, the anode metal plate, the insulating member and the cathode metal plate can be assembled in advance into an integral part, and then, after the porous sintered body is formed, the integral part and the porous sintered body can be bonded together. Therefore, the process of manufacturing the solid electrolytic capacitor can be simplified.

Preferably, at least part of the cathode metal plate serves as an external cathode terminal for surface mounting. With such a structure, the current path between the substrate to which the solid electrolytic capacitor is mounted and the cathode metal plate, for example, is shortened, whereby the inductance can be reduced.

Preferably, the solid electrolytic capacitor further comprises a metal cover electrically connected to the cathode and covering at least part of the porous sintered body. With such a structure, the porous sintered body can be protected by the metal cover. Further, the allowable power loss of the solid electrolytic capacitor can be advantageously enhanced.

Preferably, at least part of the metal cover serves as an external cathode terminal for surface mounting. With such a structure, the surface mounting of the solid electrolytic capacitor can be easily performed.

Preferably, the insulating member includes a resin film. With such a structure, unlike the insulating member formed by flowing or applying resin, problems such as formation of pinholes are unlikely to occur, so that the dielectric strength is prevented from being degraded. Therefore, the metal cover and the cathode can be reliably insulated from each other. Since the thickness of the resin film can be reduced, the thickness of the entire solid electrolytic capacitor can be reduced.

Preferably, the insulating member includes a ceramic plate. Since a ceramic plate has higher mechanical strength than that of e.g. resin, degradation of the dielectric strength caused by e.g. pinholes can be avoided. Further, problems such as change in quality can be avoided even when it is exposed to high temperature in the process of manufacturing the solid electrolytic capacitor.

Preferably, the first and the second anode terminals are anode terminals for inputting and outputting which enable circuit current to flow through the porous sintered body, and the conductive member forms a bypass current path which enables circuit current to flow from the anode terminal for inputting to the anode terminal for outputting while detouring around the porous sintered body.

With such a structure, the solid electrolytic capacitor can be structured as a so-called three-terminal or four-terminal solid electrolytic capacitor in which the circuit current can flow through the porous sintered body, which is advantageous for reducing the ESR and the ESL. Moreover, when the circuit current includes large current of DC components, this current can be caused to flow through the bypass current path to reduce the circuit current flowing through the porous sintered body. Therefore, heat generation at the porous sintered body can be suppressed. As a result, local temperature rise at the porous sintered body or clacking of the sealing resin can be prevented. Therefore, the solid electrolytic capacitor can have enhanced high frequency characteristics while being adapted for an increase of the circuit current.

Preferably, the bypass current path between the anode terminals for inputting and outputting has resistance which is lower than the resistance of the porous sintered body between the anode terminals for inputting and outputting. With such a structure, the DC component of the circuit current is likely to flow through the bypass current path. Therefore, when the DC component of the circuit current is large, the DC component flows through the bypass current path which has low resistance, so that heat generation at the anode body can be suppressed. Therefore, the capacitor can be adapted for an increase of the circuit current.

Preferably, a plurality of porous sintered bodies are provided, and the porous sintered bodies are stacked in the thickness direction of the porous sintered bodies. With such a structure, the volume of the porous sintered body constituting the solid electrolytic capacitor is increased, whereby the capacitance is increased. Although the volume of the porous sintered body is increased, the space required for mounting the solid electrolytic capacitor does not disadvantageously increase.

Preferably, a plurality of porous sintered bodies are provided, and the porous sintered bodies are arranged side by side in a direction crossing the thickness direction of the porous sintered bodies. With such a structure, each of the anode terminals provided at each of the porous sintered body can be positioned close to the substrate on which the solid electrolytic capacitor is mounted. When the distance between each of the anode terminals and the substrate is reduced, the impedance for AC of a high frequency band can be reduced, which is advantageous for reducing the ESL.

Other features and advantages of the present invention will become more apparent from the detailed description given below with reference to the accompanying drawings.

BEST MODE FOR CARRYING OUT THE INVENTION

Preferred embodiments of the present invention will be described below in detail with reference to the accompanying drawings.

Figure 1:
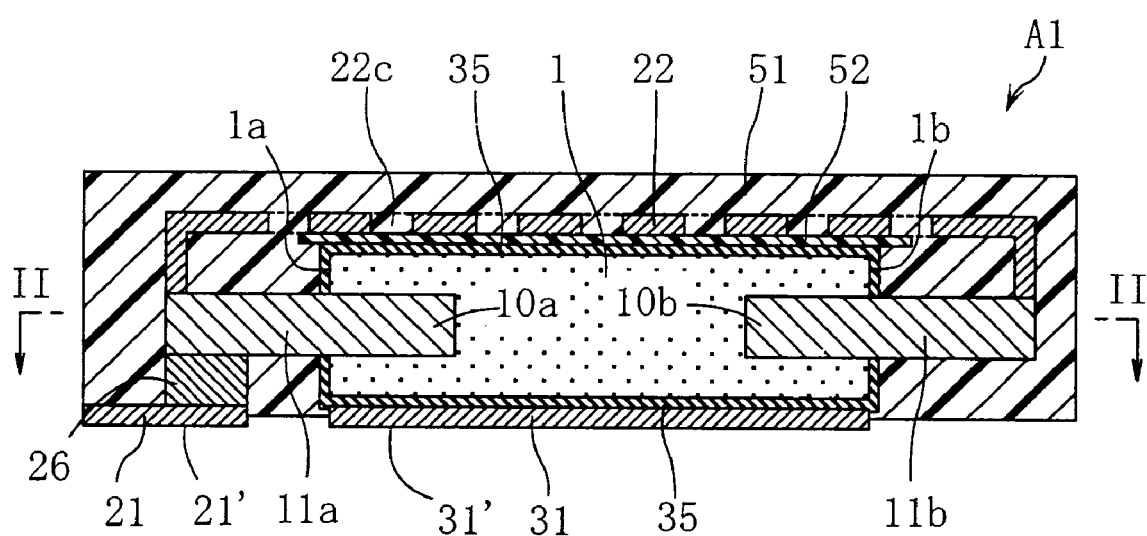
FIG. 1 is a sectional view showing an example of solid electrolytic capacitor according to the present invention.
Figure 2:
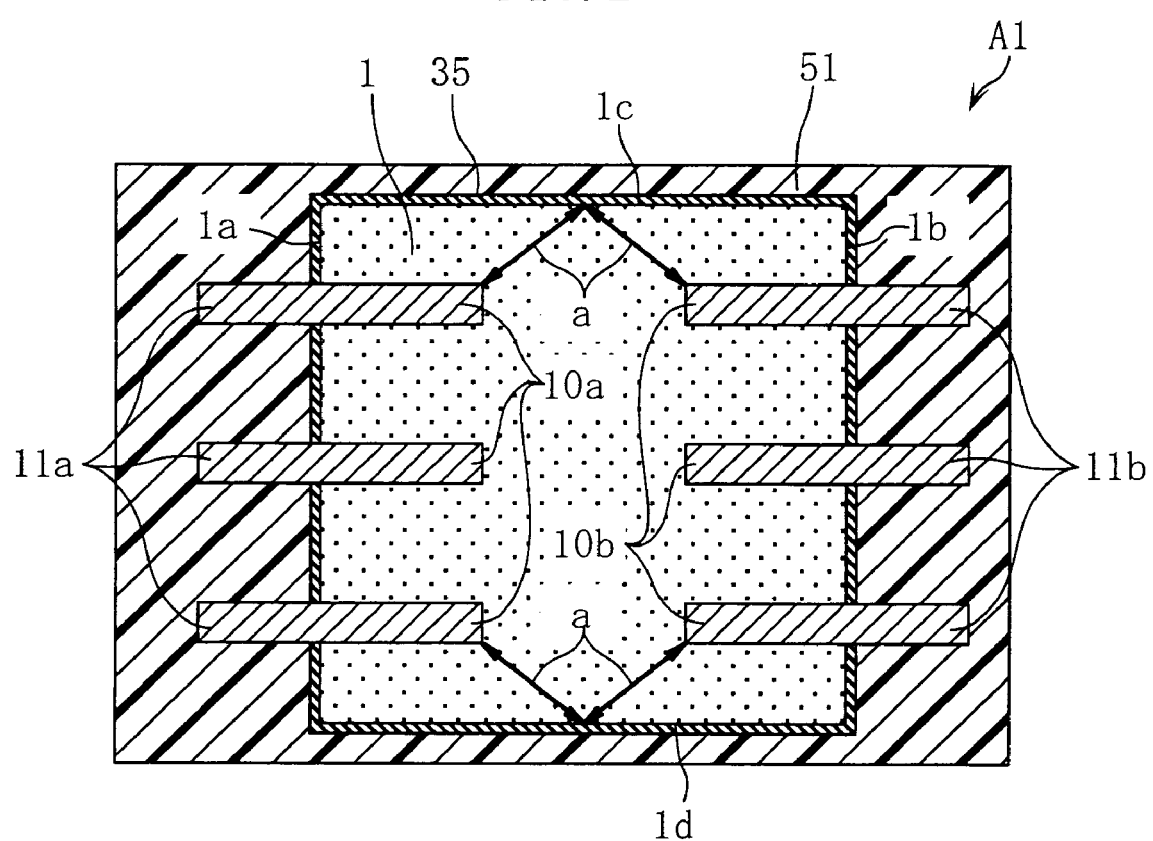
FIG. 2 is a sectional view taken along lines II-II in FIG. 1.
Figure 3:
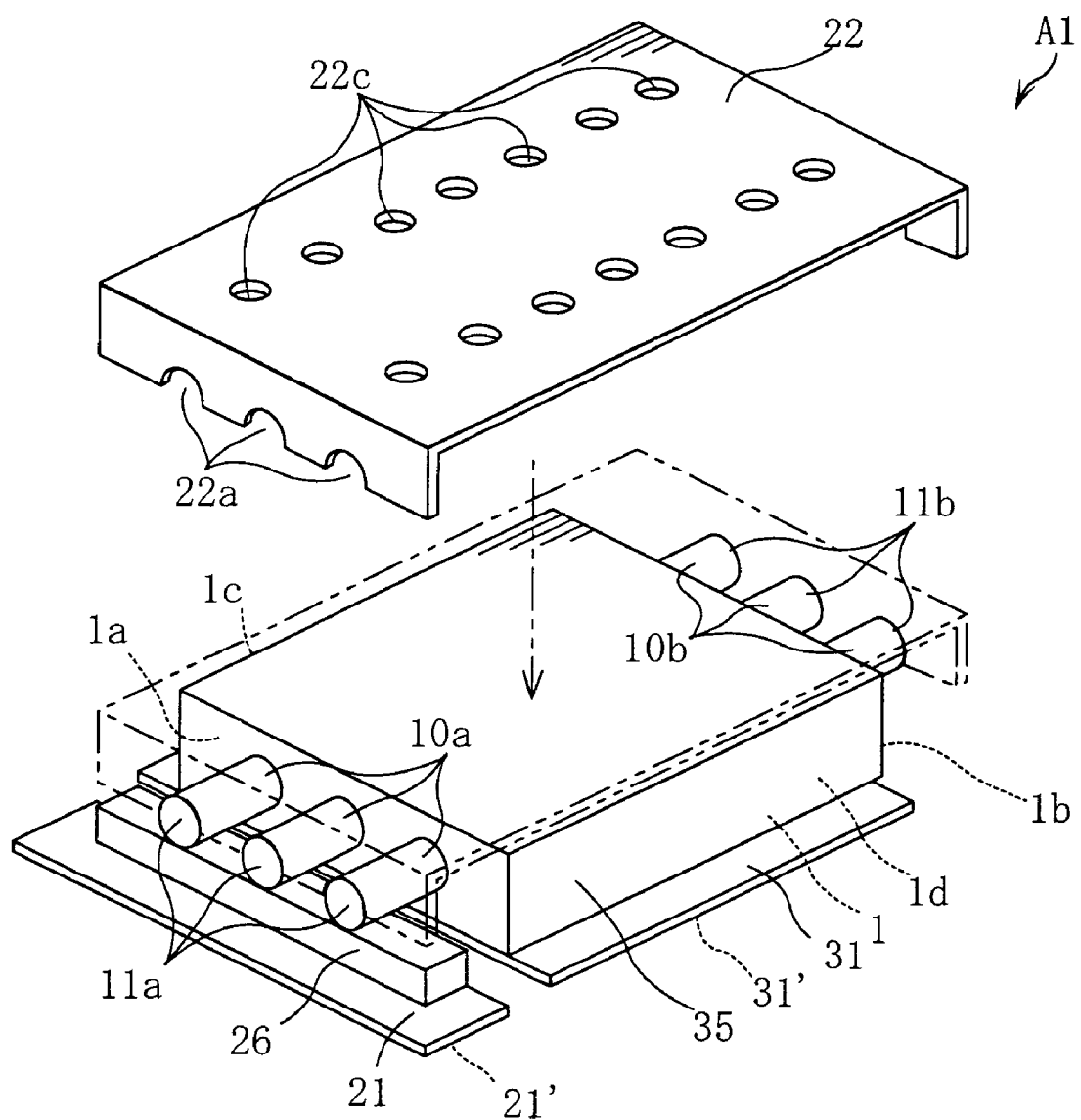
FIG. 3 is a perspective view showing a principal portion of the solid electrolytic capacitor according to the present invention.

FIGS. 1-3 show an example of solid electrolytic capacitor according to the present invention. The solid electrolytic capacitor A1 in this embodiment includes a porous sintered body 1, three first anode wires 10a, three second anode wires 10b, a metal cover 22, and sealing resin 51 covering the porous sintered body 1. In FIG. 3, the sealing resin 51 is omitted.

The porous sintered body 1 is in the form of a rectangular plate and formed by compacting niobium powder which is valve metal powder and then sintering the compacted body. The porous sintered body 1 may be made of any valve metal. For instance, tantalum may be used instead of niobium. Niobium is superior in flame retardancy to tantalum. Since the porous sintered body 1 produces heat in using the solid electrolytic capacitor A1, niobium is preferable as the material of the porous sintered body 1. A dielectric layer (not shown) is formed on a surface of the porous sintered body 1. A solid electrolytic layer (not shown) is formed on the dielectric layer. Further, a conductive resin layer 35 is formed on the outer side of the porous sintered body 1. The conductive resin layer 35 may be a silver paste layer laminated via a graphite layer, for example, and is electrically connected to the solid electrolytic layer.

Similarly to the porous sintered body 1, the first and the second anode wires 10a and 10b are made of valve metal which may be niobium. The three first anode wires 10a extend into the porous sintered body 1 through a side surface 1a of the porous sintered body 1, whereas the three second anode wires 10b extend into the porous sintered body 1 through a side surface 1b. Of the first and the second anode wires 10a and 10b, portions projecting out from the porous sintered body 1 are first and second anode terminals 11a, 11b. The first and the second anode terminals 11a and 11b are respectively bonded to opposite ends of the metal cover 22, which will be described later, and electrically connected to each other via the metal cover 22. A conductive member 26 is bonded to the three first anode terminals 11a. Under the conductive member 26 in the figure, an external anode terminal 21 is provided. The bottom surface 21' of the external anode terminal 21 is utilized for surface-mounting the solid electrolytic capacitor A1.

As shown in FIG. 3, the metal cover 22 includes an upper plate and two end plates and accommodates the porous sintered body 1. The upper plate is formed with a plurality of holes 22c. Each of the two end plates is formed with three recesses 22a. The recesses 22a are fitted to the first and the second anode terminals 11a and 11b and utilized for the welding between the metal cover 22 and the first and the second anode terminals 11a, 11b. The metal cover 22 may be made of copper, for example. Copper has a higher conductivity than that of niobium which is the material of the porous sintered body 1. Further, the metal cover 22 has a large width which is generally equal to that of the porous sintered body 1. For these reasons, the resistance of the metal cover 22 is relatively low.

As shown in FIG. 1, the resin film 52, which provides insulation between the metal cover 22 and the conductive resin layer 35, is bonded to the metal cover 22 and the conductive resin layer 35 with an adhesive (not shown). As the resin film 52, use may be made of polyimide-based film (e.g. Kapton (registered trademark) available from DuPont). Since the polyimide-based film has excellent heat resistance, it does not change in quality even when heated to a relatively high temperature in the process of manufacturing the solid electrolytic capacitor A1.

As shown in FIGS. 1 and 3, an external cathode terminal 31, which is made of a metal plate, is provided at the lower surface of the porous sintered body 1 in the figure. As the material of the external cathode terminal 31, use may be made of Cu alloy or Ni alloy. As shown in FIG. 1, the upper surface of the external cathode terminal 31 in the figure is bonded to the lower surface of the porous sintered body 1 via the conductive resin layer 35. The bottom surface 31' of the external cathode terminal 31 is utilized for surface-mounting the solid electrolytic capacitor A1.

The sealing resin 51 covers the porous sintered body 1, the anode terminals 11a, 11b, the metal cover 22 and so on to protect these parts. In the process of manufacturing the solid electrolytic capacitor A1, the sealing resin 51 can be easily impregnated around the anode terminals 11a and 11b by utilizing the holes 22c of the metal cover 22. Therefore, the sealing resin can properly insulate and protect the anode terminals 11a and 11b.

Next, the operation and advantages of the solid electrolytic capacitor A1 will be described taking the electric circuit shown in FIG. 4 as an example.

Figure 4:
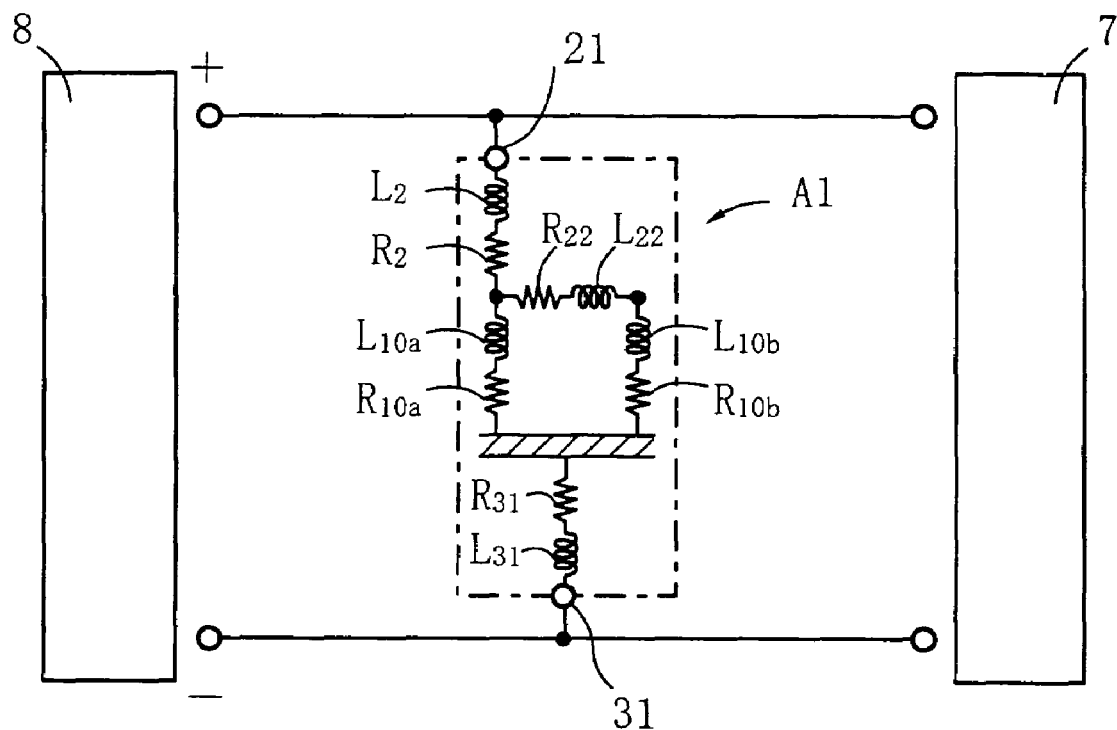
FIG. 4 is a circuit diagram of an example of electric circuit using the solid electrolytic capacitor according to the present invention.

The electric circuit shown in FIG. 4 is made up of a circuit 7, a power supply 8 and a solid electrolytic capacitor A1. The circuit 7 is the target for noise cancellation and power supply by the solid electrolytic capacitor A1. The circuit 7 may include a CPU, IC or HDD, for example. The solid electrolytic capacitor A1 is connected between the circuit 7 and the power supply 8 and utilized for preventing unnecessary noises generated from the circuit 7 from leaking toward the power supply 8 and for assisting power supply to the circuit 7. In this figure, $R_{10a}$ and $R_{10b}$ represent the resistances of the first and the second anode wires 10a and 10b, respectively, whereas $L_{10a}$ and $L_{10b}$ represent the inductances of the first and the second anode wires 10a and 10b, respectively. $R_{22}$ and $L_{22}$ respectively represent the resistance and inductance of the metal cover 22. $R_2$ and $L_2$ represent the combined resistance and inductance, respectively, of the external anode terminal 21 and conductive member 26. $R_{31}$ and $L_{31}$ represent the combined resistance and inductance, respectively, of the external cathode terminal 31 conductive resin layer 35. As shown in FIG. 1, as the current paths between the porous sintered body 1 and the external anode terminal 21, a path of current which flows through the first anode terminal 11a and a path of current which flows through the second anode terminal 11b via the metal cover 22 exist. As shown in FIG. 4, in the cancellation of noises generated from the circuit 7, the noises are distributed from the external anode terminal 21 to the two current paths and then flow into the porous sintered body 1. When the capacitor is used for power supply, the electric energy stored in the solid electrolytic capacitor A1 is distributed to the two current paths and then discharged from the external anode terminal 21.

In FIG. 2, the maximum of the distances between each portion of the conductive resin layer 35 and the first or the second anode wire 10a, 10b is indicated as the maximum distance a. In this embodiment, the maximum distance a is the distance between the portion of the conductive resin layer 35 which is formed near the center of the side surface 1c, 1d and the first and the second anode wire 10a, 10b. Since the first anode wires 10a and the second anode wires 10b extend into the porous sintered body 1 in opposite directions, the maximum distance a is small. When the maximum distance a is small, the resistance and inductance between the first and the second anode wires 10a, 10b and the conductive resin film 35 becomes low, so that the ESR and ESL of the solid electrolytic capacitor A1 can be reduced. According to this embodiment, therefore, noise cancellation performance is enhanced with respect to a wide frequency band including a high frequency band, and high responsiveness in power supply can be realized. Further, this structure can advantageously reduce the maximum distance even when the size of the porous sintered body 1 is increased to increase the capacitance of the solid electrolytic capacitor A1 or the thickness of the porous sintered body 1 is reduced to reduce the ESL. The maximum distance can be advantageously reduced as long as the first anode wires 10a and the second anode wires 10b extend into the porous sintered body in different directions. For instance, unlike this embodiment, the direction in which the first anode wires 10a extend and the direction in which the second anode wires 10b extend may be perpendicular to each other.

Figure 23:
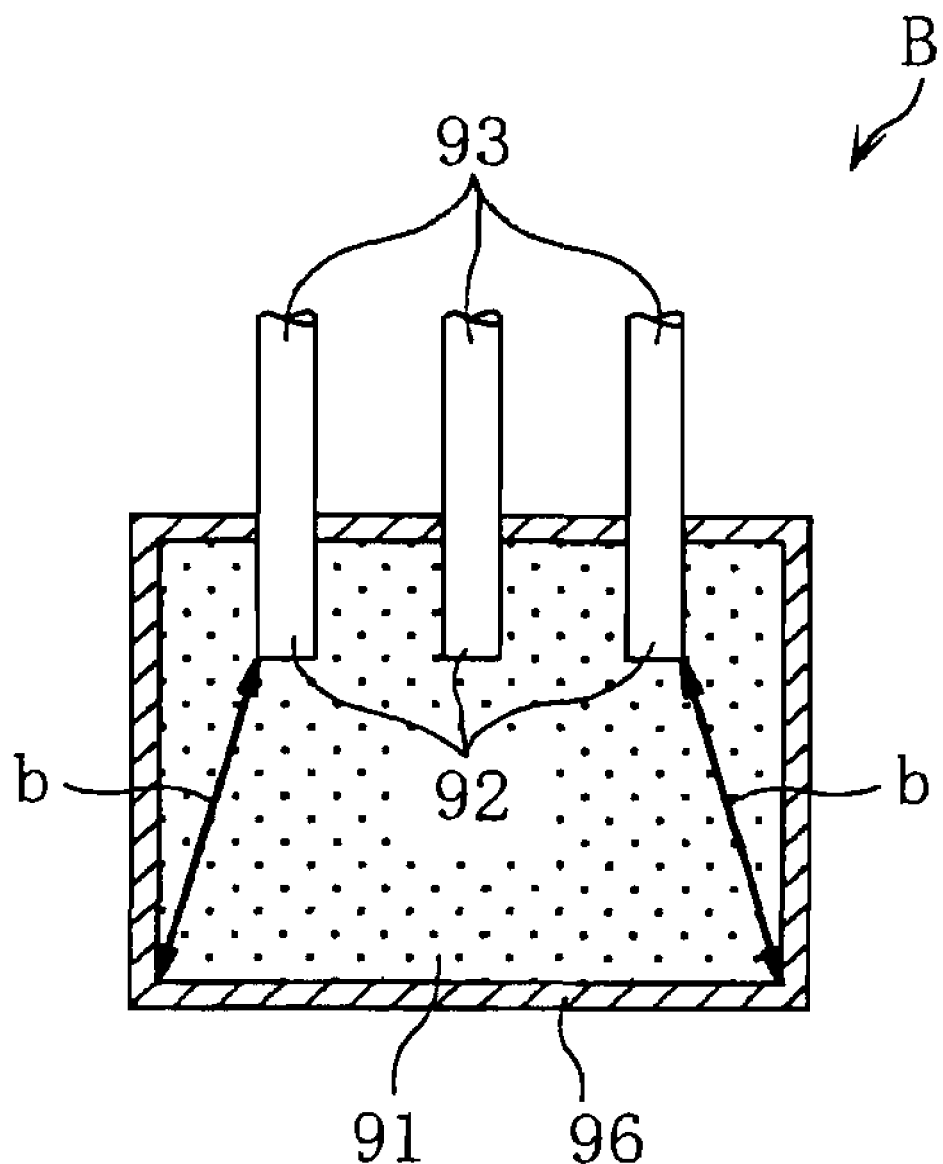
FIG. 23 is a sectional view showing an example of conventional solid electrolytic capacitor.
Figure 24:
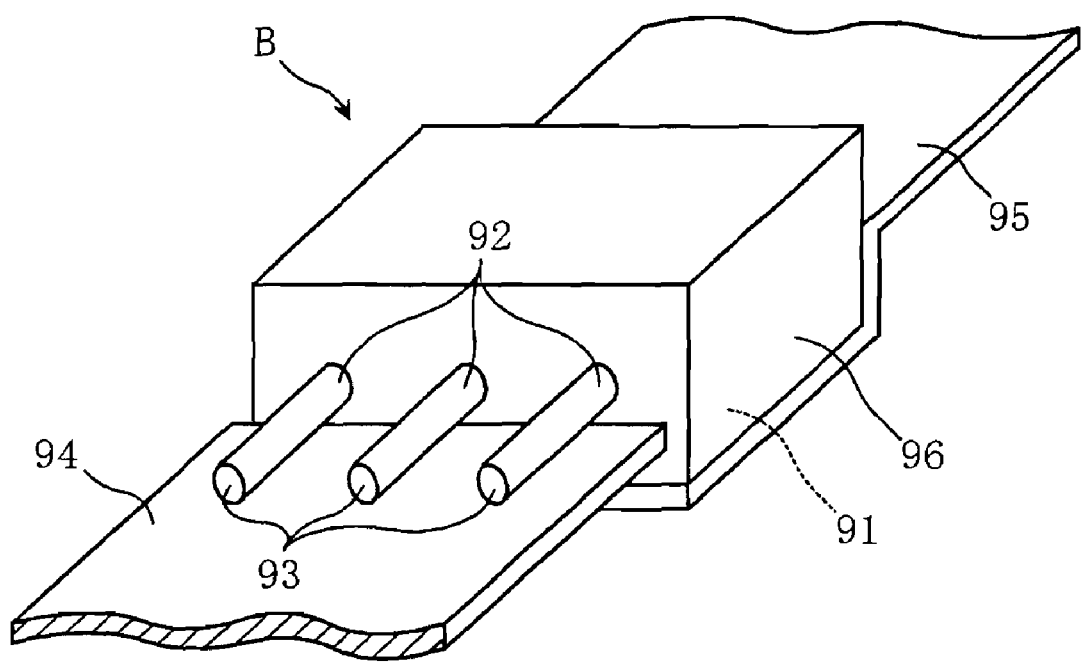
FIG. 24 is a perspective view showing a principal portion of the conventional solid electrolytic capacitor.

Since the porous sintered body 1 is flat, the strength of the porous sintered body 1 may become insufficient when many anode wires are provided at one side surface. To avoid such a drawback, the number of anode wires provided at one surface needs to be limited. In this embodiment, however, the first anode wires 10a and the second anode wires 10b are provided at different side surfaces of the porous sintered body 1. Therefore, as compared with e.g. the conventional structure shown in FIG. 23, a larger number of anode wires can be provided. Therefore, the ESR and the ESL of the solid electrolytic capacitor A1 can be reduced without unduly reducing the strength of the porous sintered body 1.

The resistance and inductance of the metal cover 22 can be reduced, as noted before. In FIG. 4, when the resistance $R_{22}$ and inductance $L_{22}$ of the metal cover 22 are reduced, current readily flows not only through the first anode terminals 11a but also through the second anode terminals 11b. Therefore, by the provision of the metal cover 22, the first and the second anode terminals 11a and 11b can be effectively used, which leads to the reduction of the ESR and ESL of the solid electrolytic capacitor A1.

The metal cover 22 has a sufficiently high mechanical strength. Therefore, even when the porous sintered body 1 generates heat, the solid electrolytic capacitor A1 is prevented from being entirely deformed. Therefore, the sealing resin 51 is prevented from cracking, so that the exposure of the porous sintered body 1 to the air is prevented. Further, the metal cover 22 is superior in thermal conductivity to the sealing resin 51. Therefore, heat dissipation from the porous sintered body 1 to the outside can be promoted. Therefore, the allowable power loss of the solid electrolytic capacitor A1 can be increased, which is advantageous for adaptation to high power supply.

In this embodiment, a part for establishing conduction between the first and the second anode terminals 11a and 11b does not need to be provided besides the metal cover 22, which is advantageous for reducing the manufacturing cost.

The metal cover 22 and the conductive resin layer 35 are insulated from each other by the resin film 52. Conceivably, unlike this embodiment, the insulation between the metal cover 22 and the conductive resin layer 35 may be provided by applying insulating resin to the upper surface of the porous sintered body 1, for example. In such a case, however, insulating resin is applied to form a thin film, so that pinholes are likely to be formed. Such pinholes, if formed, unduly provides conduction between the metal cover 22 and the conductive resin layer 35, which may leads to problems such as short-circuit in the solid electrolytic capacitor A1. Unlike this, the use of the resin film 52 can prevent the formation of pinholes even when it is thin. Therefore, the metal cover 22 and the conductive resin layer 35 can be reliably insulated from each other. Instead of the resin film 52, a ceramic plate may be used. As compared with the resin film 52, for example, a ceramic plate has higher mechanical strength, and hence, the formation of pinholes can be avoided. Moreover, since the ceramic plate has excellent heat resistance as compared with resin, it does not change in quality even when heated to a relatively high temperature in the process of manufacturing the solid electrolytic capacitor A1.

The metal cover 22 is formed with a plurality of holes 22c. For instance, by utilizing the holes 22c of the metal cover 22 which are located close to the opposite ends of the metal cover 22, the sealing resin 51 can be easily introduced around the first and the second anode terminals 11a and 11b. Therefore, the first and the second anode terminals 11a and 11b are reliably insulated. Further, since the adhesive (not shown) for bonding the resin film 52 to the metal cover 22 can be applied into the holes 22c, the application amount of the adhesive is increased. Therefore, the bonding strength between the resin film 52 and the metal cover 22 is advantageously increased. Further, the resistance and inductance of the metal cover 22 can be easily adjusted by changing the size or arrangement of the holes 22c.

FIGS. 5-22 show other embodiments of the present invention. In these figures, the elements which are identical or similar to those of the foregoing embodiment are designated by the same reference signs as those used in the foregoing embodiment.

Figure 5:
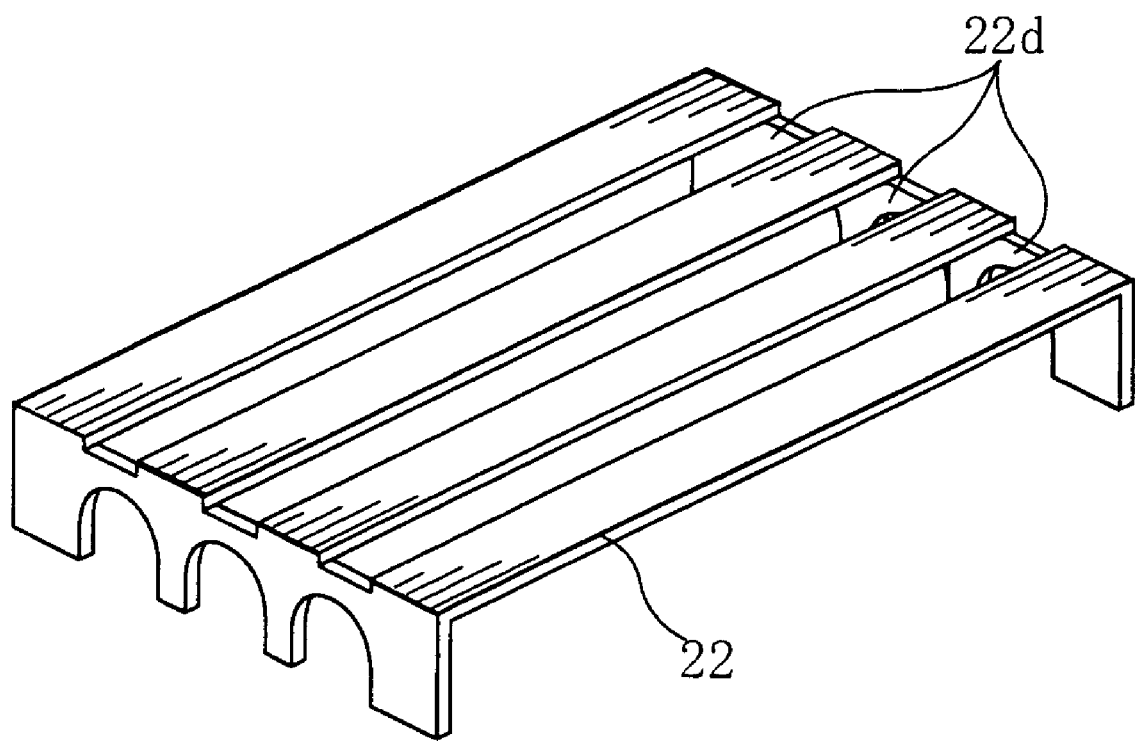
FIG. 5 is an overall perspective view showing another example of metal cover used for the solid electrolytic capacitor according to the present invention.
Figure 6:
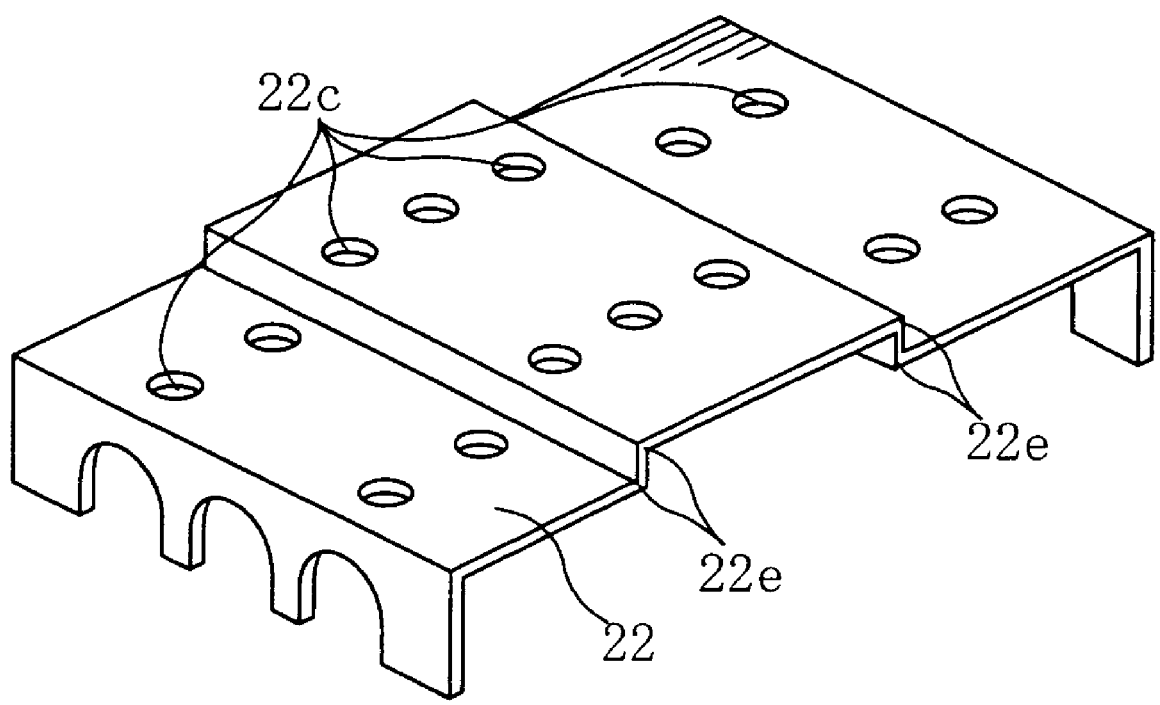
FIG. 6 is an overall perspective view showing another example of metal cover used for the solid electrolytic capacitor according to the present invention.

FIGS. 5 and 6 show other examples of a metal cover used for a solid electrolytic capacitor of the present invention. The metal cover 22 shown in FIG. 5 is formed with three slits 22d extending longitudinally of the cover. According to this embodiment, the inductance of the metal cover 22 can be easily adjusted by changing the shape, size and number of the slits 22d. The slits 22d can be utilized also for adjusting the electric resistance of the metal cover 22.

The metal cover 22 shown in FIG. 6 is formed with four bent portions 22e. According to this embodiment, the bent portions 22e act similarly to a coil relative to high frequency alternating current. Therefore, the inductance of the metal cover 22 can be adjusted by the bent portions 22e.

Figure 7:
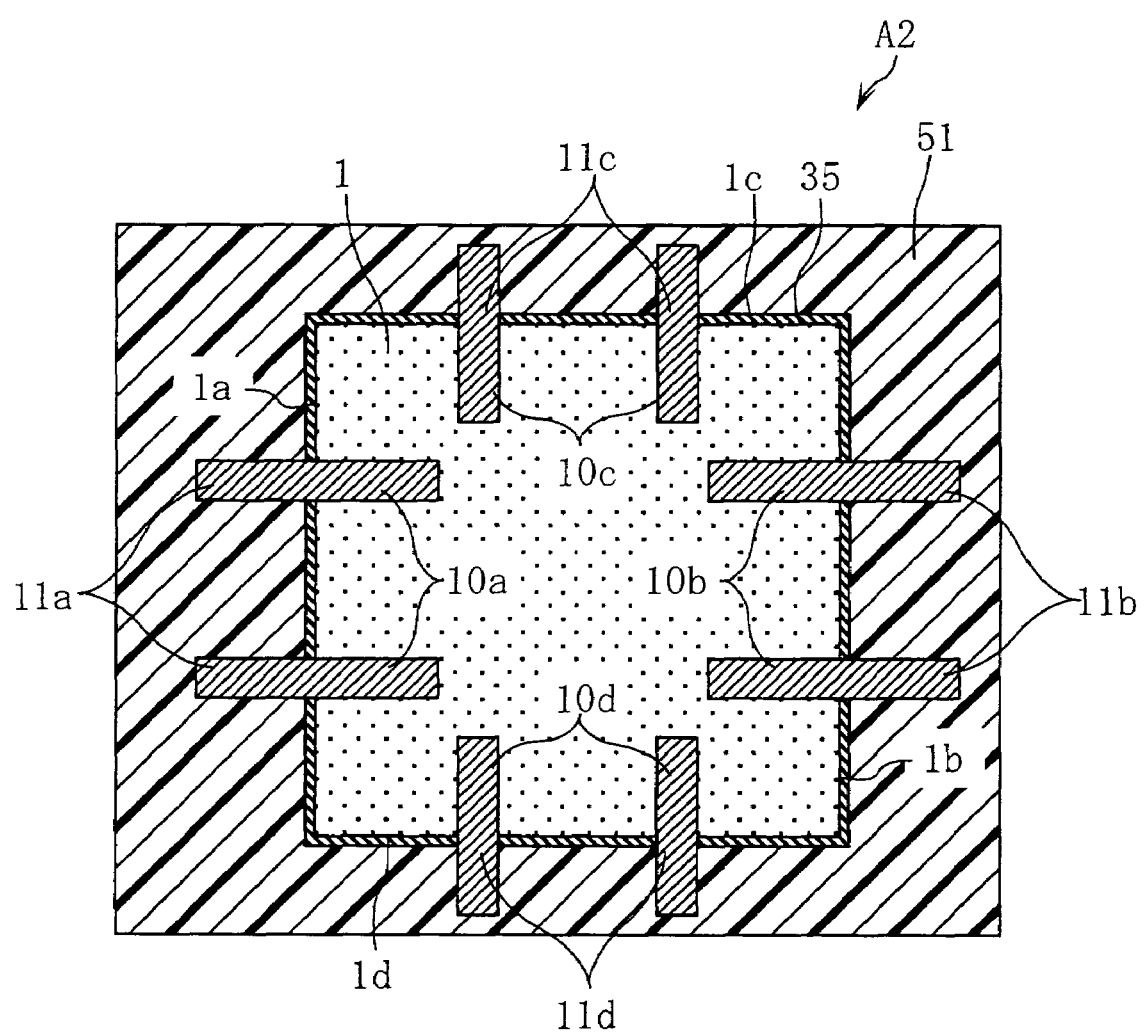
FIG. 7 is a sectional view showing another example of solid electrolytic capacitor according to the present invention.
Figure 8:
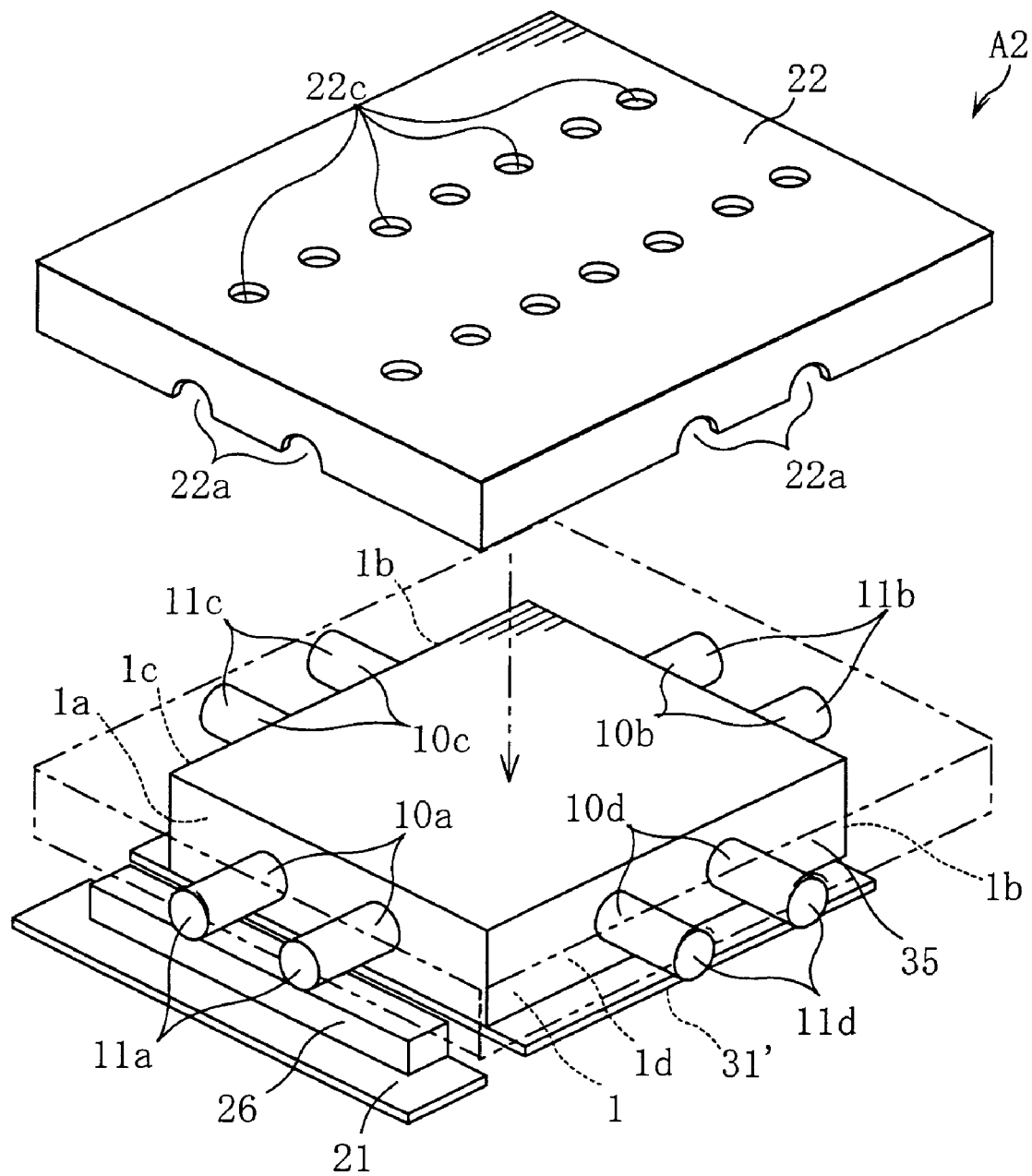
FIG. 8 is a perspective view showing a principal portion of the solid electrolytic capacitor according to the present invention.

In the solid electrolytic capacitor A2 shown in FIGS. 7 and 8, paired anode wires 10a-10d extend into the porous sintered body 1 through the four side surfaces 1a-1d, respectively, of the porous sintered body 1. Portions of the wires which project out from the porous sintered body are first through fourth anode terminals 11a-11d. As shown in FIG. 8, the metal cover 22 is in the form of a box capable of covering the porous sintered body 1 from four sides. The anode terminals 11a-11d are bonded to the metal cover 22 to be electrically connected to each other. According to this embodiment, the maximum distance between the anode terminals 11a-11d and the conductive resin layer 35 can be further reduced, which is advantageous for reducing the ESR and the ESL. Further, since the porous sintered body 1 is covered by the metal cover 22 from four sides, the warping of the entire solid electrolytic capacitor A2 is prevented further reliably, and the heat dissipation effect is enhanced.

Figure 9:
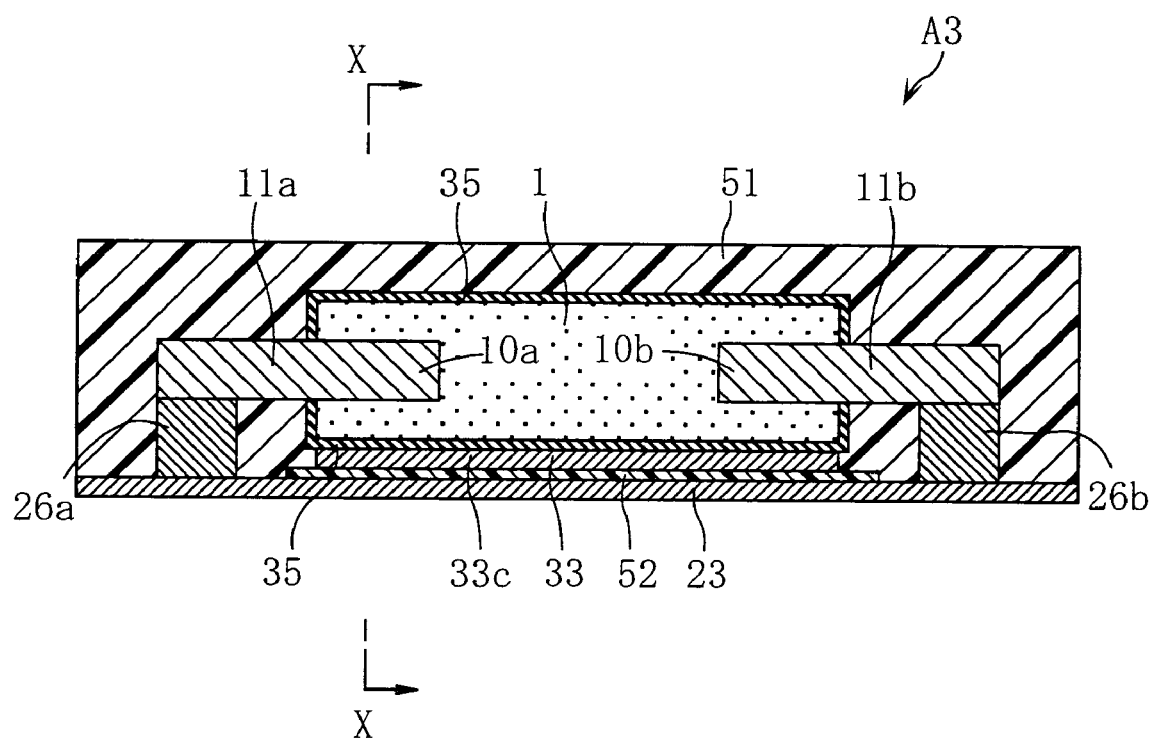
FIG. 9 is a sectional view showing another example of solid electrolytic capacitor according to the present invention.
Figure 10:
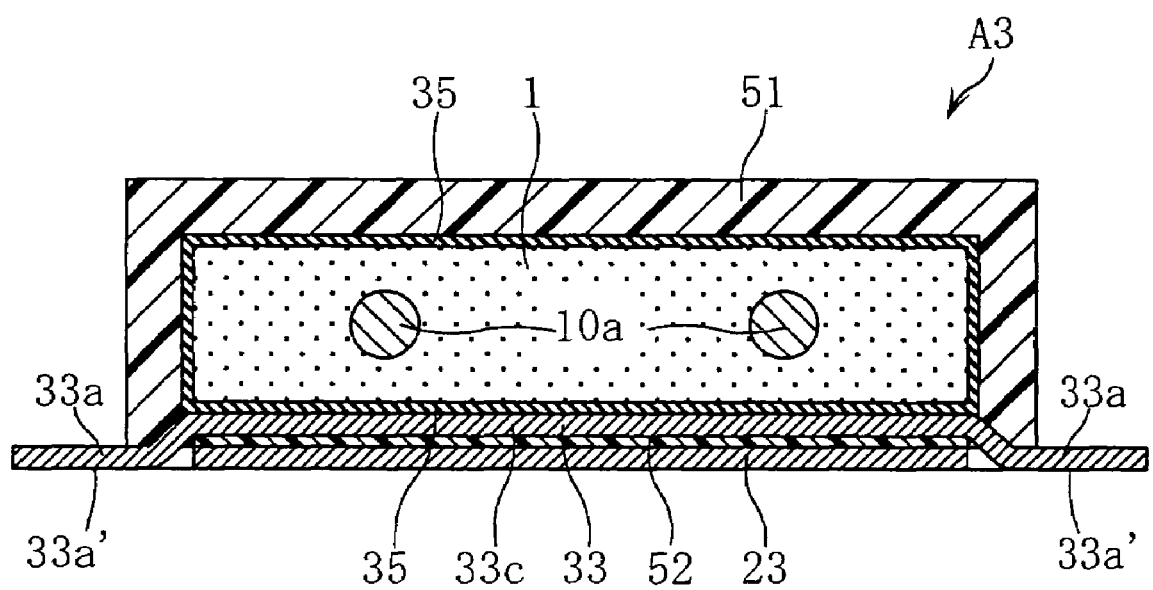
FIG. 10 is a sectional view taken along lines X-X in FIG. 9.
Figure 11:
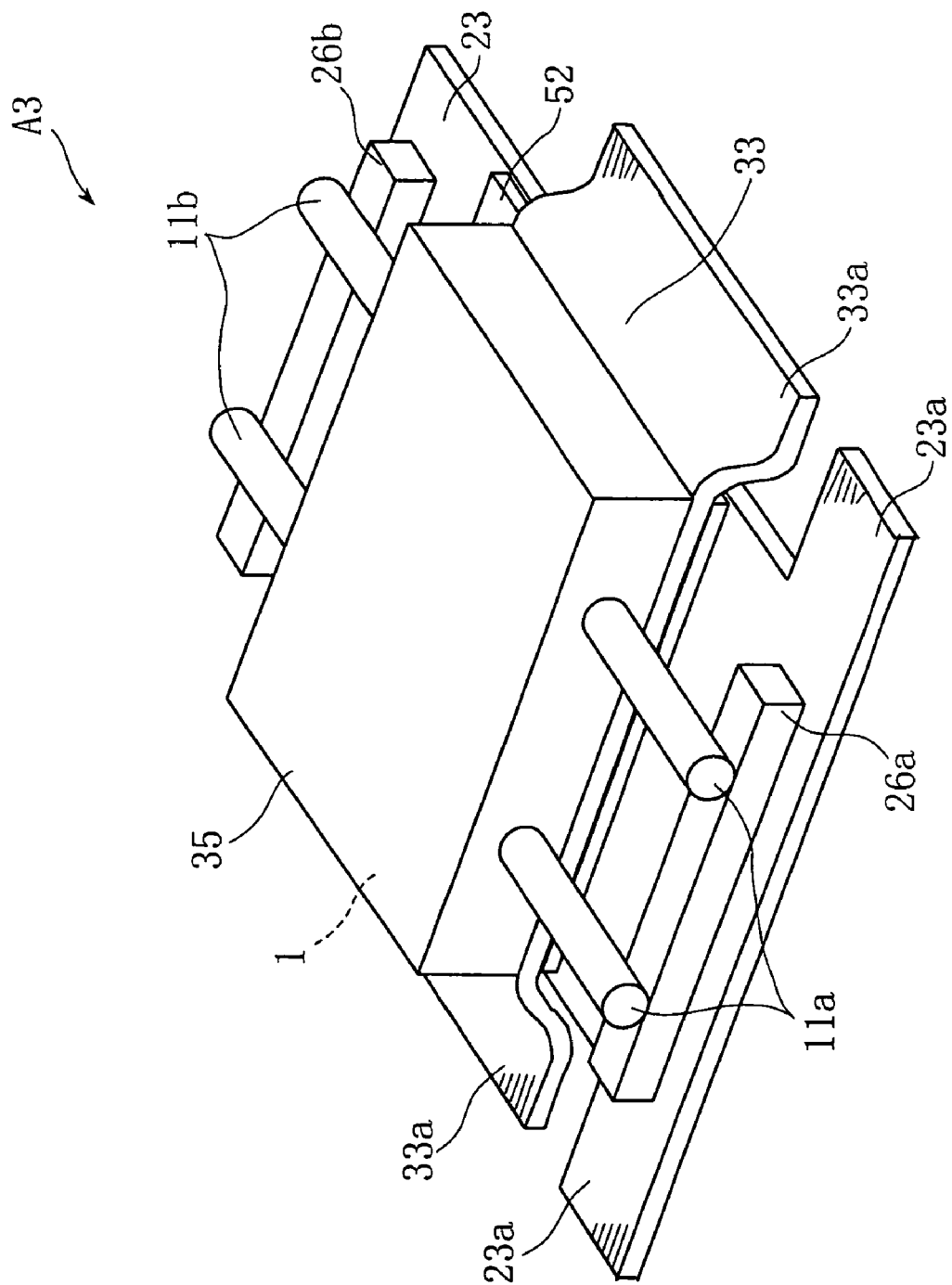
FIG. 11 is a perspective view showing a principal portion of the solid electrolytic capacitor according to the present invention.
Figure 12:
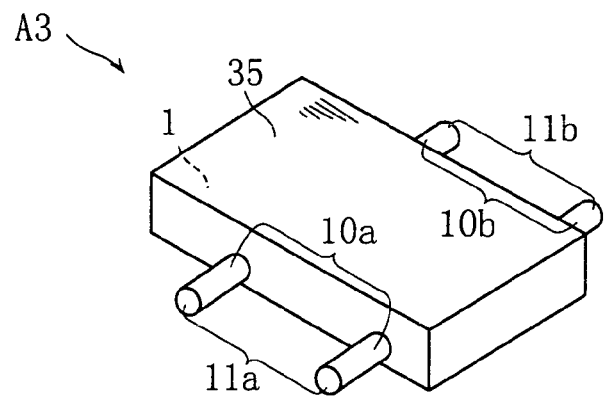
FIG. 12 is an exploded perspective view showing a principal portion of the solid electrolytic capacitor according to the present invention.
Figure 12:
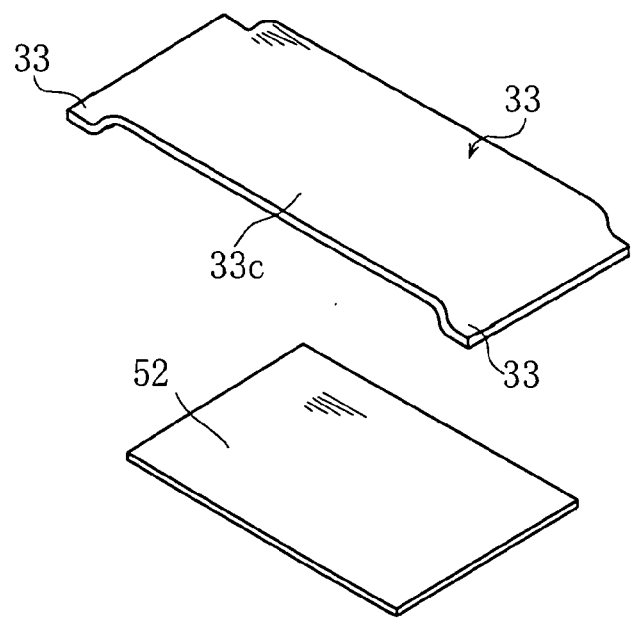
Figure 12:
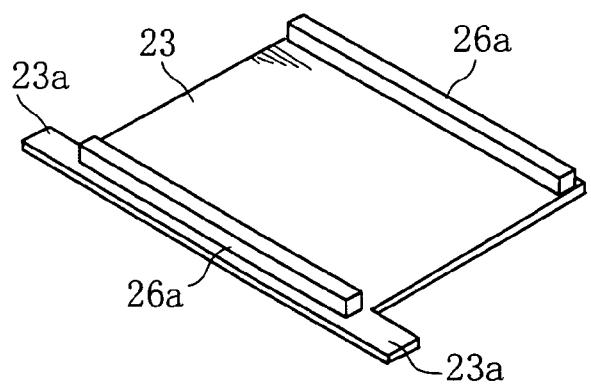

The solid electrolytic capacitor A3 shown in FIGS. 9-12 differs from those of the foregoing embodiment in that the first and the second anode terminals 11a and 11b are electrically connected to each other by an anode metal plate 23. In FIGS. 11 and 12, sealing resin 51 is omitted.

The solid electrolytic capacitor A3 is provided with the anode metal plate 23, a cathode metal plate 33 and a resin film 52. The cathode metal plate 33 includes a center portion 33c bonded to the bottom surface of the porous sintered body 1 via a conductive resin layer 35 and is electrically connected to a solid electrolytic layer (not shown) formed on a surface of the porous sintered body 1. As shown in FIG. 10, the cathode metal plate 33 includes two external cathode terminals 33a extending out from the center portion 33c.

As shown in FIGS. 9 and 10, the anode metal plate 23 is laminated on the lower surface of the center portion 33c via the insulating resin film 52. As shown in FIG. 9, conductive members 26a and 26b are bonded to portions of the anode metal plate 23 which are adjacent to the opposite ends, whereby the anode metal plate is electrically connected to the first and the second anode terminals 11a and 11b. Therefore, the first and the second anode terminals 11a and 11b are electrically connected to each other via the anode metal plate 23. As shown in FIGS. 11 and 12, the anode metal plate 23 includes two external anode terminals 23a. A stepped portion is provided between the center portion 33c and each of the external cathode terminals 33a of the cathode metal plate 33. The bottom surfaces of the external anode terminals 23a and the bottom surfaces of the external cathode terminals 33a are generally flush with each other. As the material of the anode metal plate 23 and the cathode metal plate 33, a Cu alloy or a Ni alloy may be used for example.

According to this embodiment, in the process of manufacturing the solid electrolytic capacitor A3, the anode metal plate 23, the resin film 52, the cathode metal plate 33 and the conductive members 26a, 26b can be assembled in advance into an integral part, and then, after the porous sintered body 1 is formed, the integral part and the porous sintered body 1 can be bonded together. Therefore, the manufacturing process can be simplified and the productivity can be enhanced as compared with the manufacturing process in which a plurality of members for providing the external anode terminals and the external cathode terminals are bonded one by one to the porous sintered body 1.

Since the anode metal plate 23 and the cathode metal plate 33 are laminated via the resin film 52, the metal plates are properly insulated from each other. Both of the anode metal plate 23 and the cathode metal plate 33 are in the form of a generally flat plate, and the resin film 52 is a thin film. Therefore, the height of the solid electrolytic capacitor A3 can be reduced.

Since the cathode metal plate 23 is in the form of a flat plate without a stepped portion, the inductance is low. Therefore, by reducing the ESL, the noise cancellation performance in a high frequency band can be enhanced, and high responsiveness in power supply can be realized.

Figure 13:
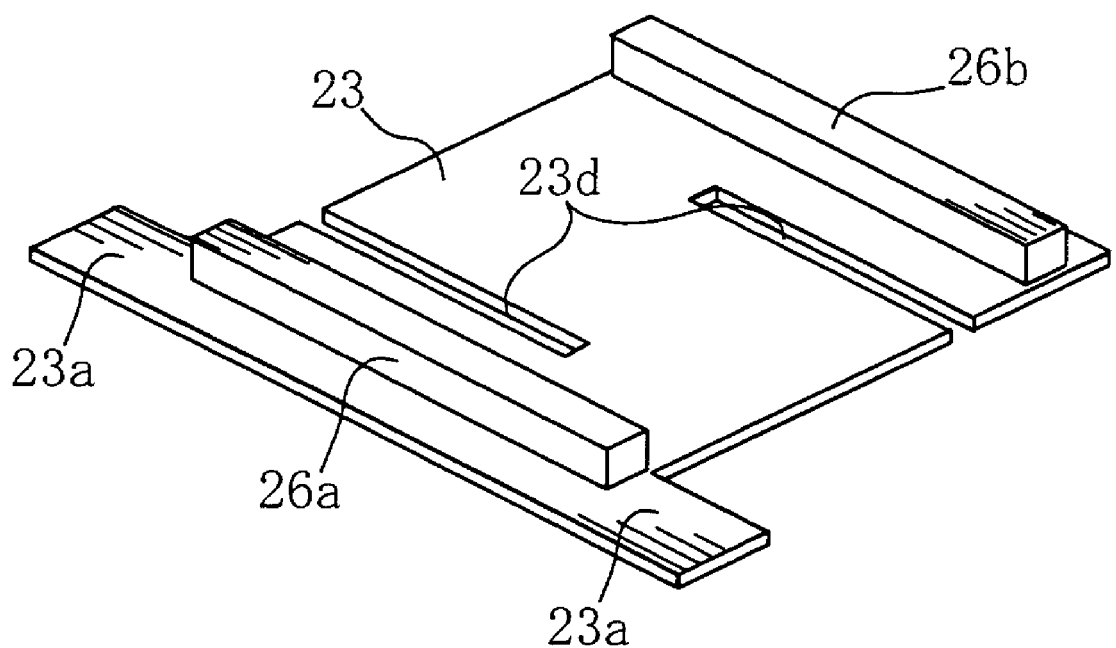
FIG. 13 is an overall perspective view showing another example of anode metal plate used for the solid electrolytic capacitor according to the present invention.

FIG. 13 shows another example of anode metal plate used for a solid electrolytic capacitor according to the present invention. The anode metal plate 23 is formed with two slits 23d. The slits 23d extend inward from two opposite sides of the anode metal plate 23. According to this embodiment, the inductance of the anode metal plate 23 can be increased. As will be understood from this embodiment, the inductance of the anode metal plate 23 can be adjusted by forming a slit 23d in the anode metal plate 23, for example.

Figure 14:
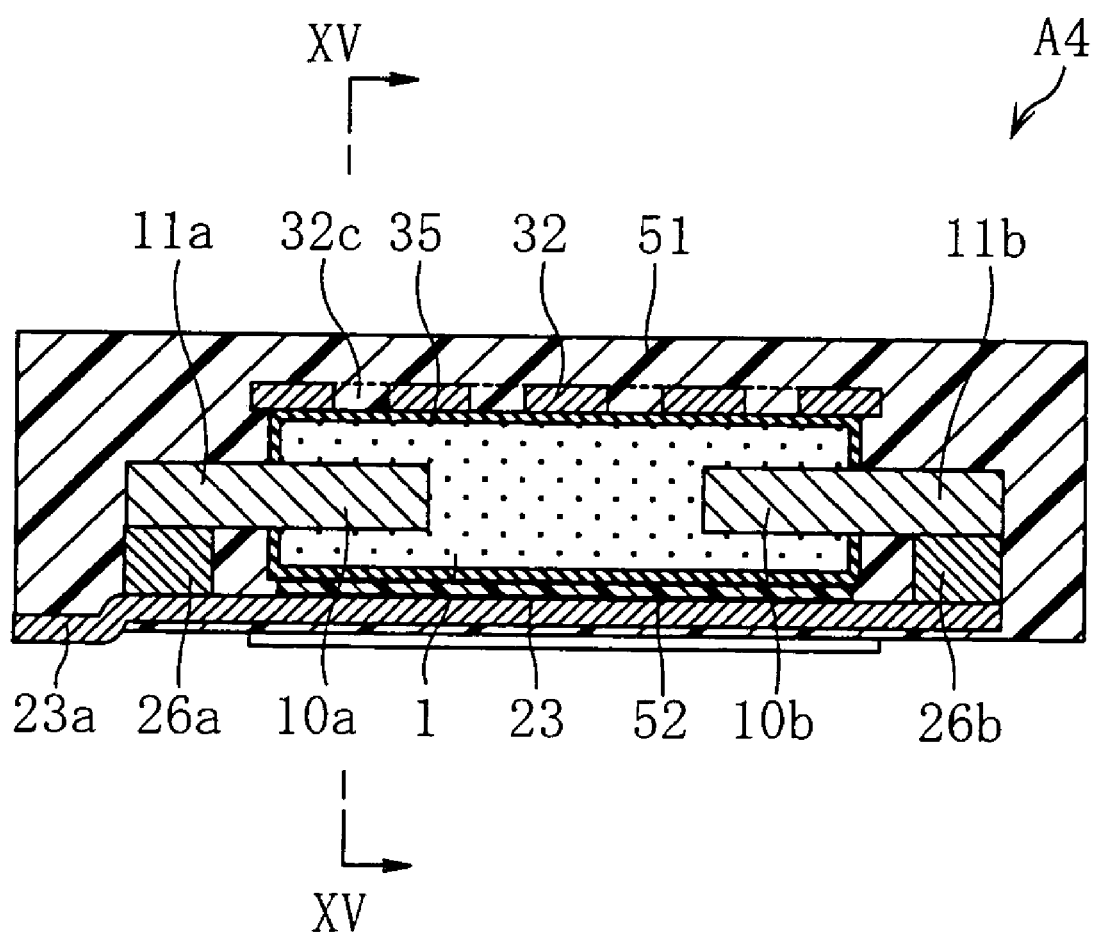
FIG. 14 is a sectional view showing another example of solid electrolytic capacitor according to the present invention.
Figure 15:
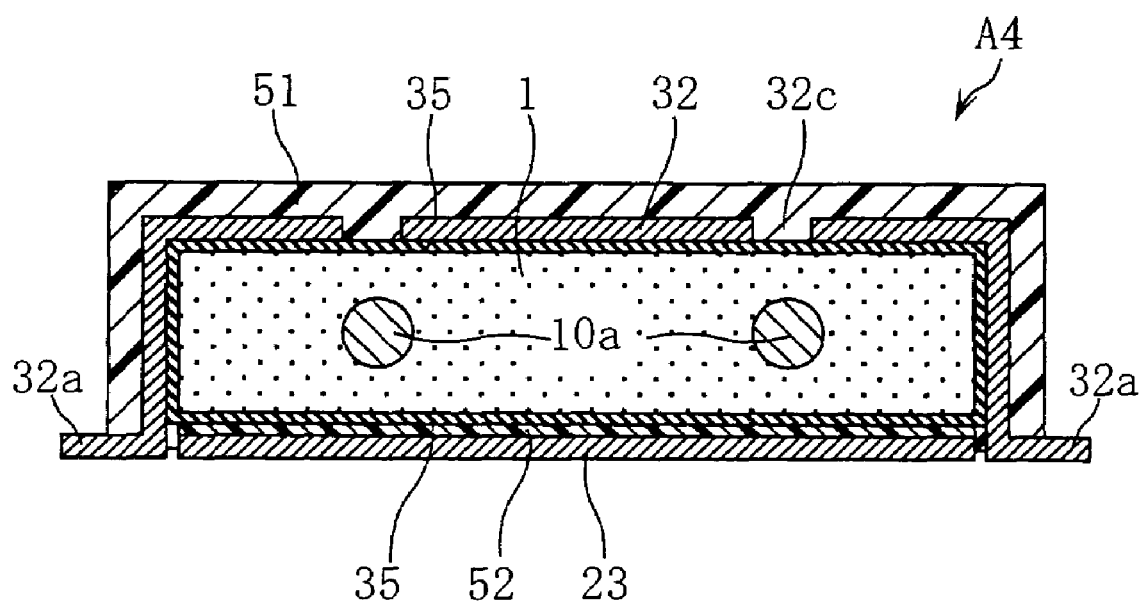
FIG. 15 is a sectional view taken along lines XV-XV in FIG. 14.
Figure 16:
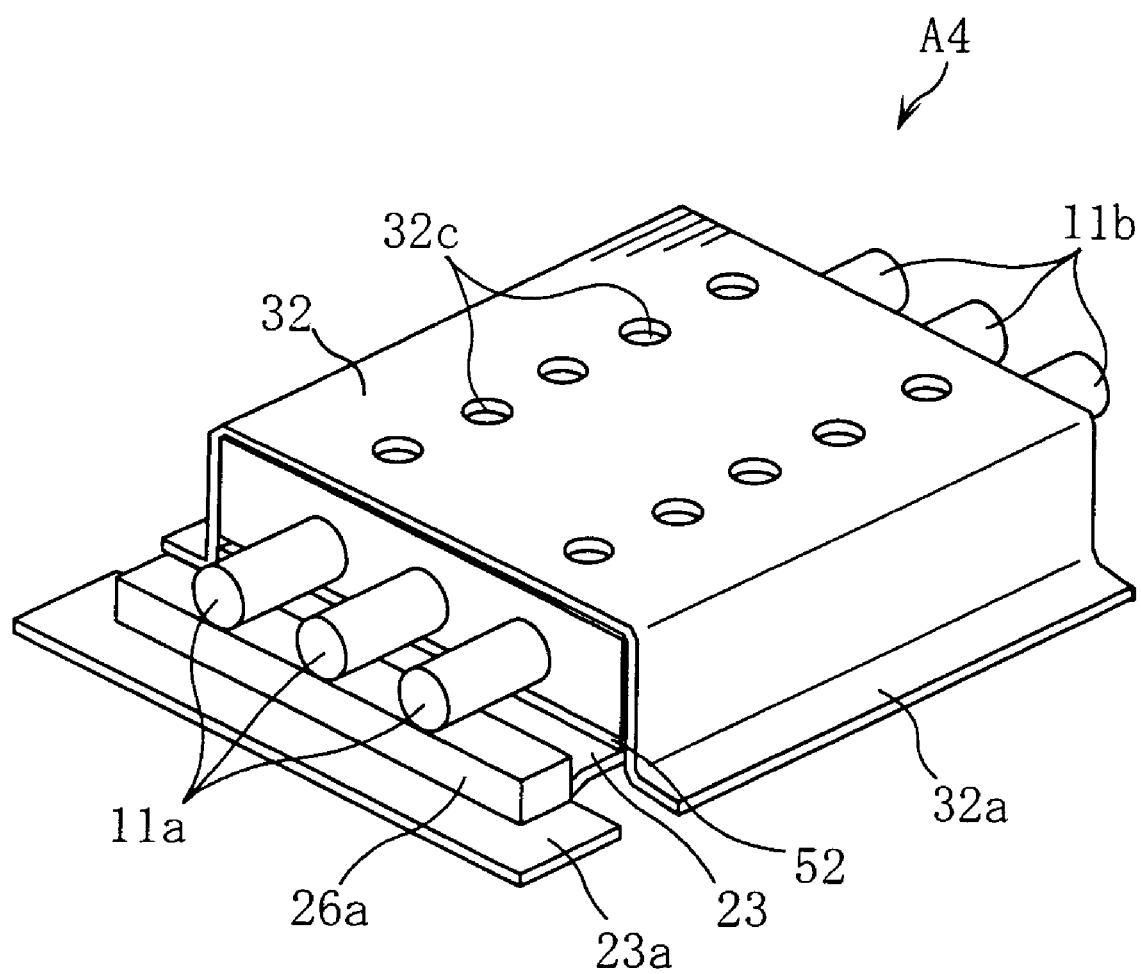
FIG. 16 is a perspective view showing a principal portion of the solid electrolytic capacitor according to the present invention.

The solid electrolytic capacitor A4 shown in FIGS. 14-16 includes a metal cover 32 electrically connected to the solid electrolytic layer of the porous sintered body 1 and having a plurality of holes 32c. The metal cover 32 accommodates the porous sintered body 1 and is bonded to the porous sintered body 1 via a conductive resin layer 35, as shown in FIGS. 14 and 15. As shown in FIGS. 15 and 16, opposite ends of the metal cover 32 provide external cathode terminals 32a. As shown in FIGS. 14 and 15, an anode metal plate 23 is laminated to the lower surface of the porous sintered body 1 via a resin film 52. As shown in FIGS. 14 and 16, an end of the anode metal plate 23 provides an external anode terminal 23a.

According to this embodiment, since the first and the second anode terminals 11a and 11b are electrically connected to each other via the anode metal plate 23, the inductance between the first and the second anode terminals 11a and 11b can be made low. Further, since the metal cover 32 protects the porous sintered body 1, the sealing resin 51 is prevented from cracking. Moreover, the heat dissipation of the solid electrolytic capacitor A4 can be enhanced.

Figure 17:
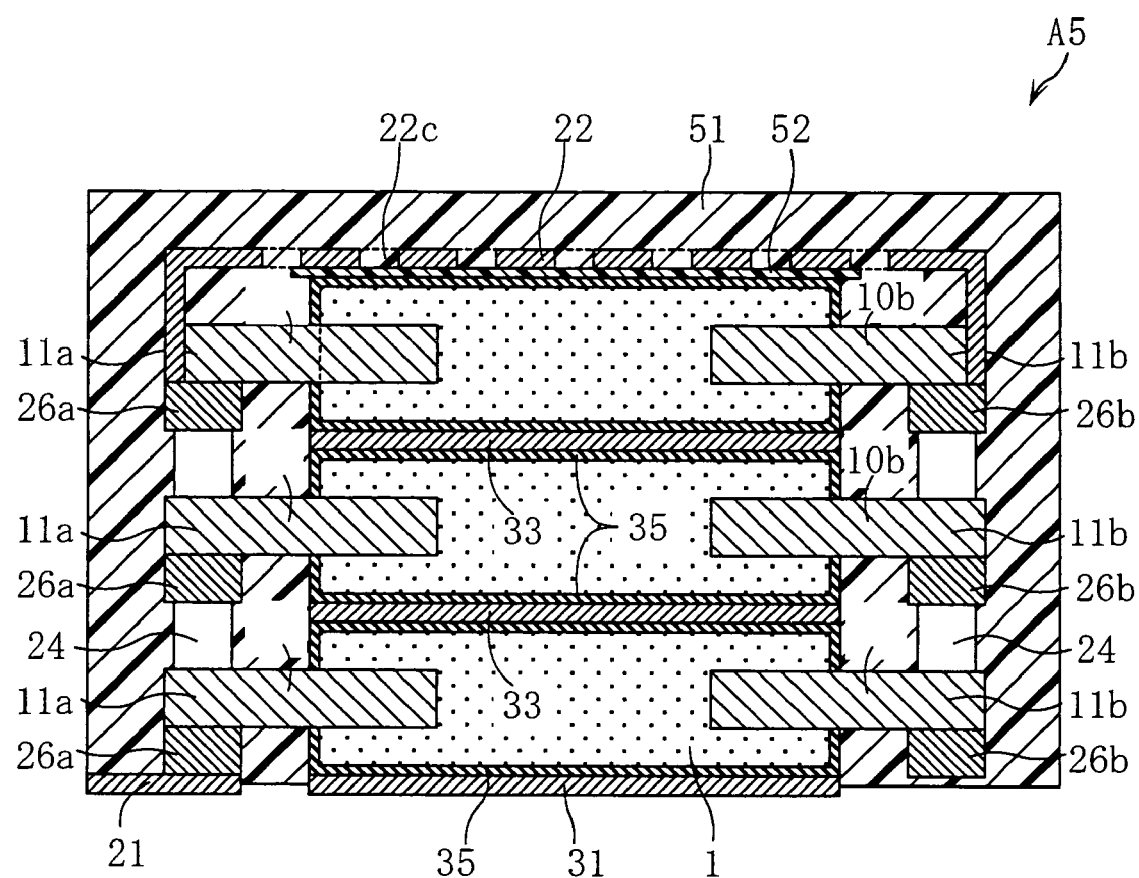
FIG. 17 is a sectional view showing another example of solid electrolytic capacitor according to the present invention.
Figure 18:
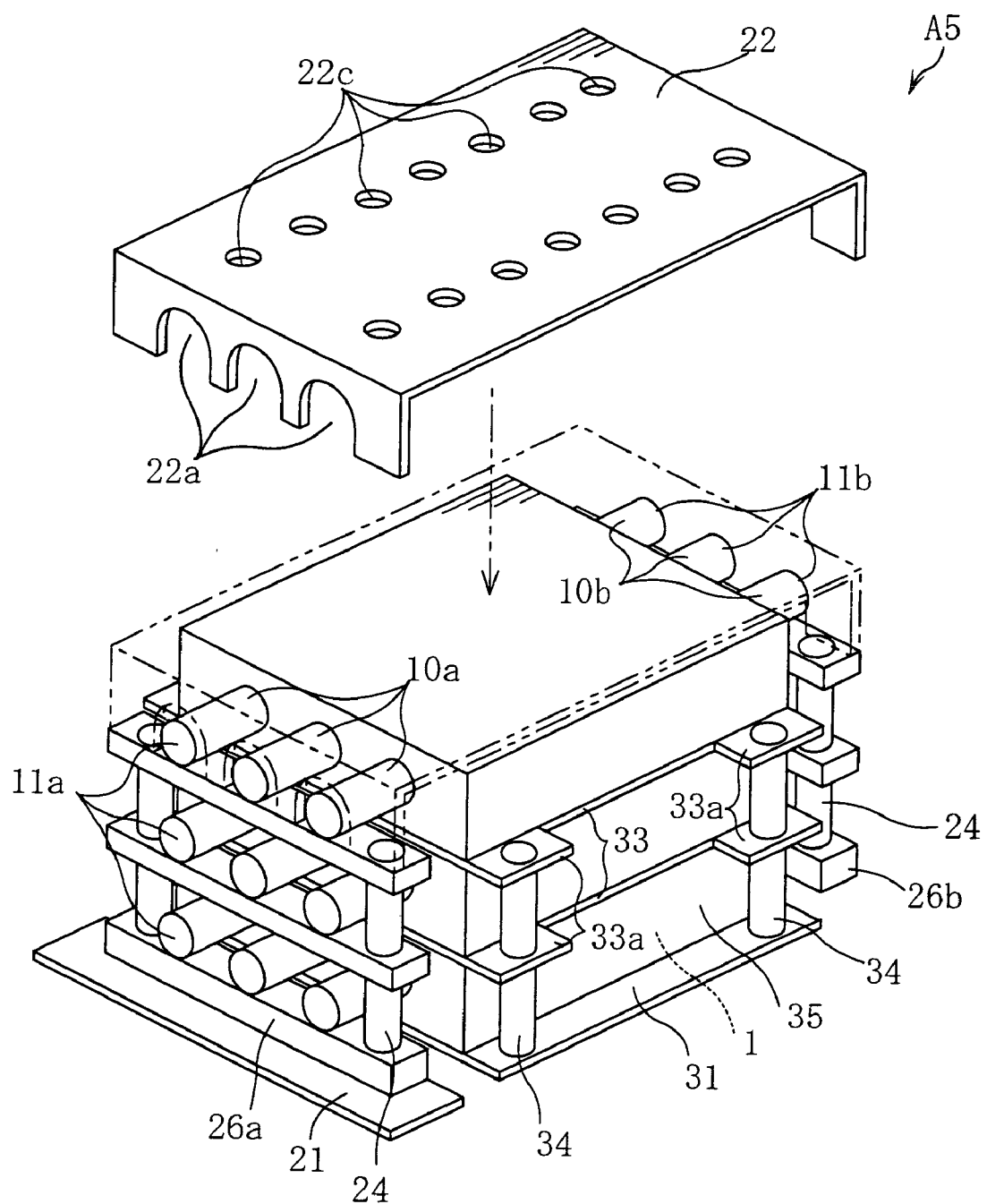
FIG. 18 is a perspective view showing a principal portion of the solid electrolytic capacitor according to the present invention.

The solid electrolytic capacitor A5 shown in FIGS. 17 and 18 includes three flat porous sintered bodies 1 stacked one upon another. Two adjacent porous sintered bodies 1 are bonded together via conductive resin layers 35, with a flat cathode metal plate 33 interposed therebetween. As shown in FIG. 18, extensions 33a of each of the cathode metal plate 33 and the external cathode terminal 31 are formed with holes, and a plurality of connecting members 34 are provided to extend through the holes. As a result, the external cathode lead terminal 31 and two cathode metal plates 33 are electrically connected to the solid electrolytic layers formed on the surfaces of the porous sintered bodies 1 and also electrically connected to each other. Similarly, three conductive members 26a and three conductive members 26b are provided each of which is formed with two holes. A plurality of connecting members 24 are provided to extend through the holes. As a result, electrical conduction is established between the nine anode wires 10a and between the nine anode wires 10b. The connecting members 24 and 34 may be made of copper, for example. A metal cover 22 is so provided as to cover the uppermost porous sintered body 1 and electrically connected to the uppermost conductive members 26a and 26b. Therefore, the three porous sintered bodies 1 and the metal cover 22 are electrically connected in parallel.

According to this embodiment, the capacitance of the solid electrolytic capacitor A5 can be increased by the provision of the three porous sintered bodies 1. Since each of the porous sintered bodies 1 is thin, the current path between the external cathode terminal 31, each of the cathode metal plates 33 and each of the anode wires 10a, 10b can be shortened, whereby the ESR and the ESL can be reduced. Since the three porous sintered bodies 1 are stacked, the space required for mounting the solid electrolytic capacitor A5 is generally equal to that required for mounting a solid electrolytic capacitor including a single porous sintered body 1. Therefore, the size of the device incorporating the solid electrolytic capacitor A5 is advantageously reduced. Further, by the connecting members 24 and 34, the resistance between the external anode terminal 21 or the external cathode terminal 31 and each of the porous sintered bodies 1 can be reduced.

Figure 19:
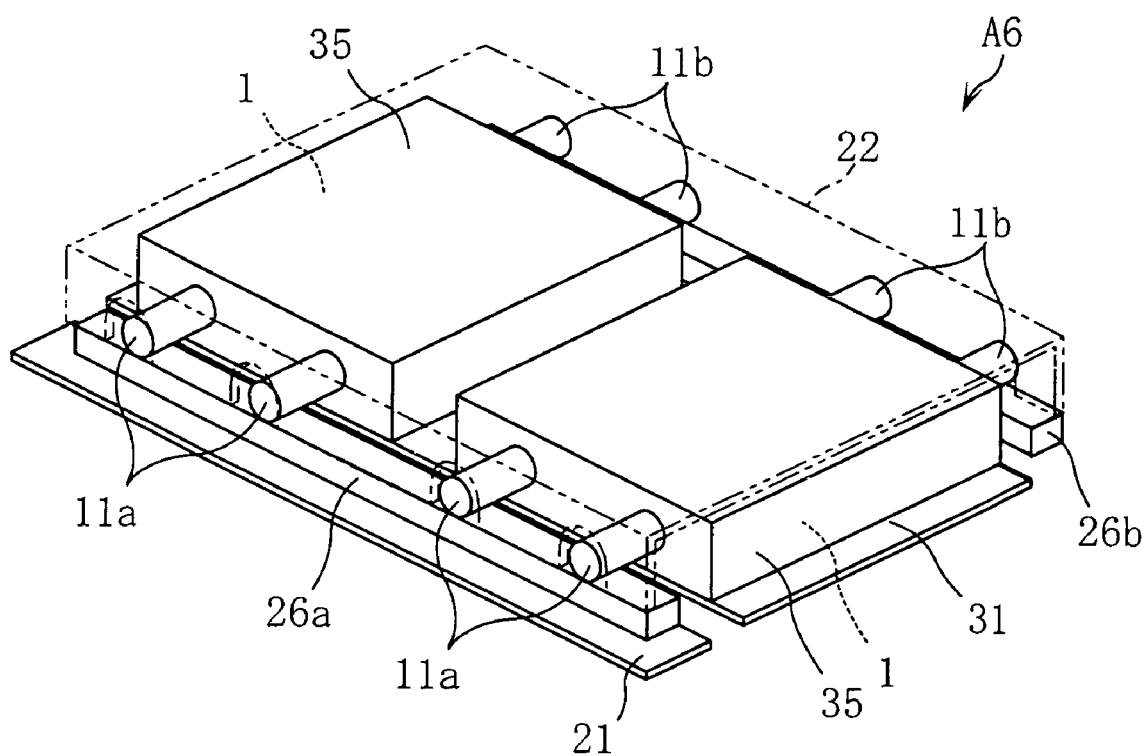
FIG. 19 is a perspective view showing a principal portion of another example of solid electrolytic capacitor according to the present invention.

The solid electrolytic capacitor A6 shown in FIG. 19 includes two porous sintered bodies 1. The porous sintered bodies 1 are arranged side by side in a direction crossing the thickness direction thereof. Two first anode terminals 11a and two second anode terminals 11b extend into each of the porous sintered bodies 1. The first and the second anode terminals 11a and 11b are electrically connected to each other via the metal cover 22 and the conductive members 26a, 26b. The metal cover 22 has a size capable of accommodating the two porous sintered bodies 1.

Similarly to the solid electrolytic capacitor A5 shown in FIGS. 17 and 18, the capacitance can be increased also in this embodiment. Further, for instance, the distance between the first anode terminals 11a and the substrate to which the solid electrolytic capacitor A6 is mounted can be reduced. Accordingly, the current path between the wiring pattern formed on the substrate and the first anode terminals 11a can be shortened. As a result, the impedance of the current path can be reduced, whereby the ESL of the solid electrolytic capacitor A6 is reduced. The two porous sintered bodies 1 are arranged side by side in a direction crossing the direction in which the first and the second anode terminals 11a and 11b extend. Therefore, the distance between the first and the second anode terminals 11a, 11b is not increased by the provision of a plurality of porous sintered bodies 1, which is advantageous for reducing the ESR and the ESL. It is to be noted that more than two porous sintered bodies 1 may be provided. A plurality of metal covers 22 may be provided to individually cover the porous sintered bodies 1.

Figure 20:
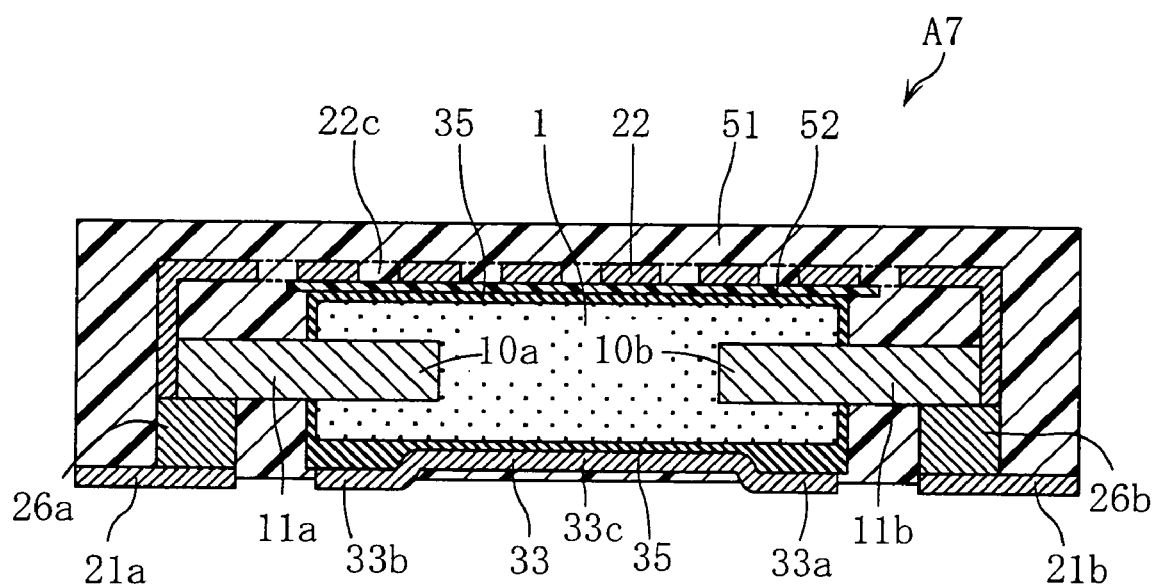
FIG. 20 is a sectional view showing another example of solid electrolytic capacitor according to the present invention.
Figure 21:
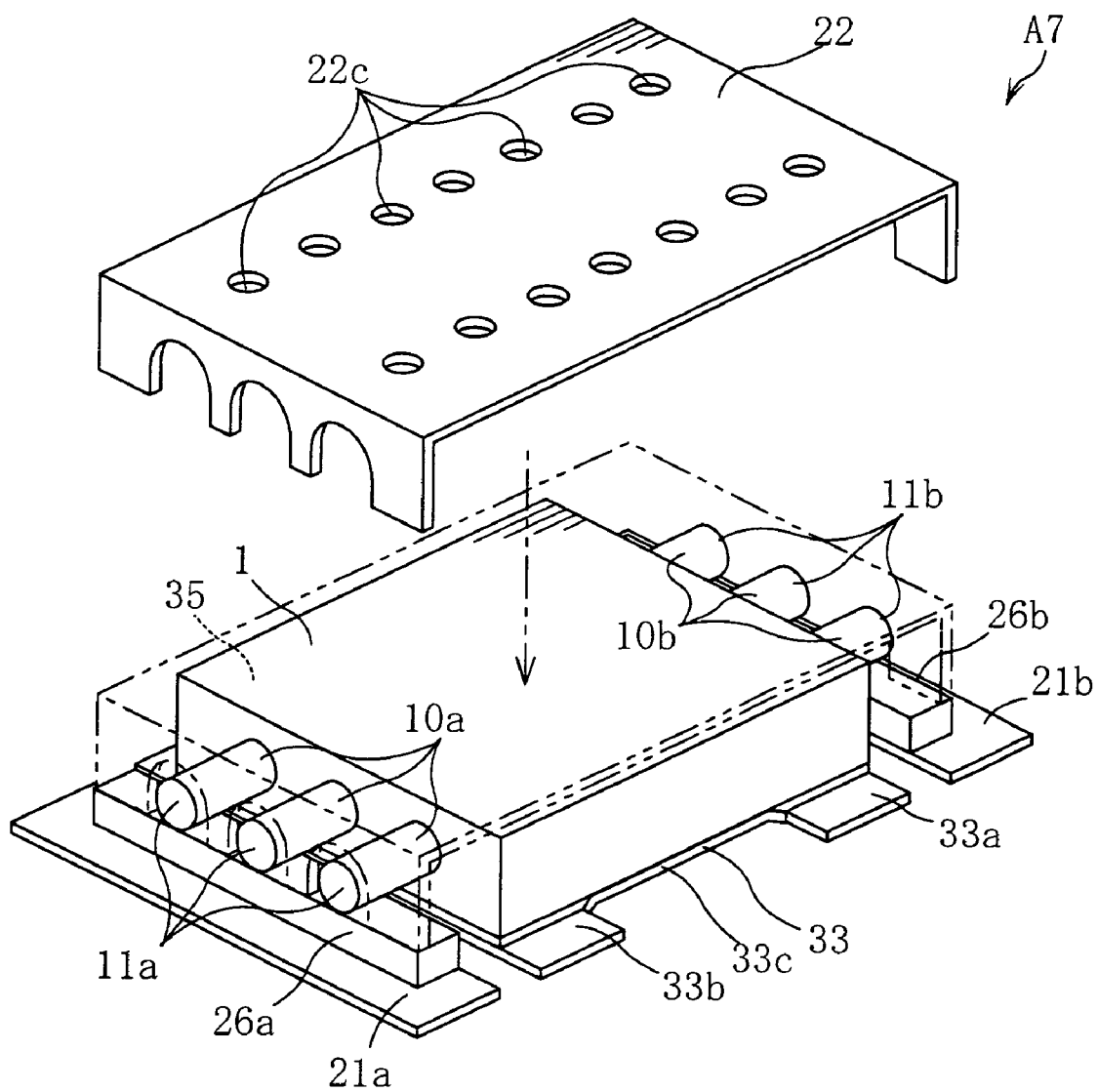
FIG. 21 is a perspective view showing a principal portion of the solid electrolytic capacitor according to the present invention.

Unlike the foregoing embodiments, the solid electrolytic capacitor A7 shown in FIGS. 20 and 21 is structured as a so-called four-terminal solid electrolytic capacitor by utilizing the first and the second anode terminals 11a and 11b as the anode terminals for inputting and for outputting, respectively.

Specifically, the first and the second anode terminals 11a and 11b are electrically connected to the external anode terminals 21a and 21b for inputting and outputting, respectively, via conductive members 26a and 26b, thereby serving as anode terminals for inputting and outputting. With this structure, in the solid electrolytic capacitor A7, the circuit current can flow through the porous sintered body 1.

The metal cover 22 is electrically connected to the anode terminals 11a and 11b for inputting and outputting via the conductive members 26a and 26b. Therefore, a bypass current path is formed between the anode terminals 11a, 11b for inputting and outputting. The bypass current path enables the circuit current to flow so as to detour around the porous sintered body 1. Similarly to the solid electrolytic capacitor A1 described above, the resistance of the metal cover 22 is lower than that of the porous sintered body 1. Further, the metal cover 22 includes a bent portion and is formed with a plurality of holes 22c, so that the inductance thereof is relatively high. For instance, the inductance is higher than the inductance between the anode terminals 11a, 11b for inputting or outputting and the external cathode terminals 33a, 33b.

The cathode metal plate 33 is provided at the lower surface of the porous sintered body 1. A stepped portion exists between the center portion 33c and each of the external cathode terminals 33a, 33b for inputting and outputting. The upper surface of the center portion 33c is bonded to the solid electrolytic layer of the porous sintered body 1 via the conductive resin layer 35. The lower surface of the center portion 33c is covered by the sealing resin 51.

The operation and advantages of the solid electrolytic capacitor A7 will be described below taking the electric circuit shown in FIG. 22 as an example.

Figure 22:
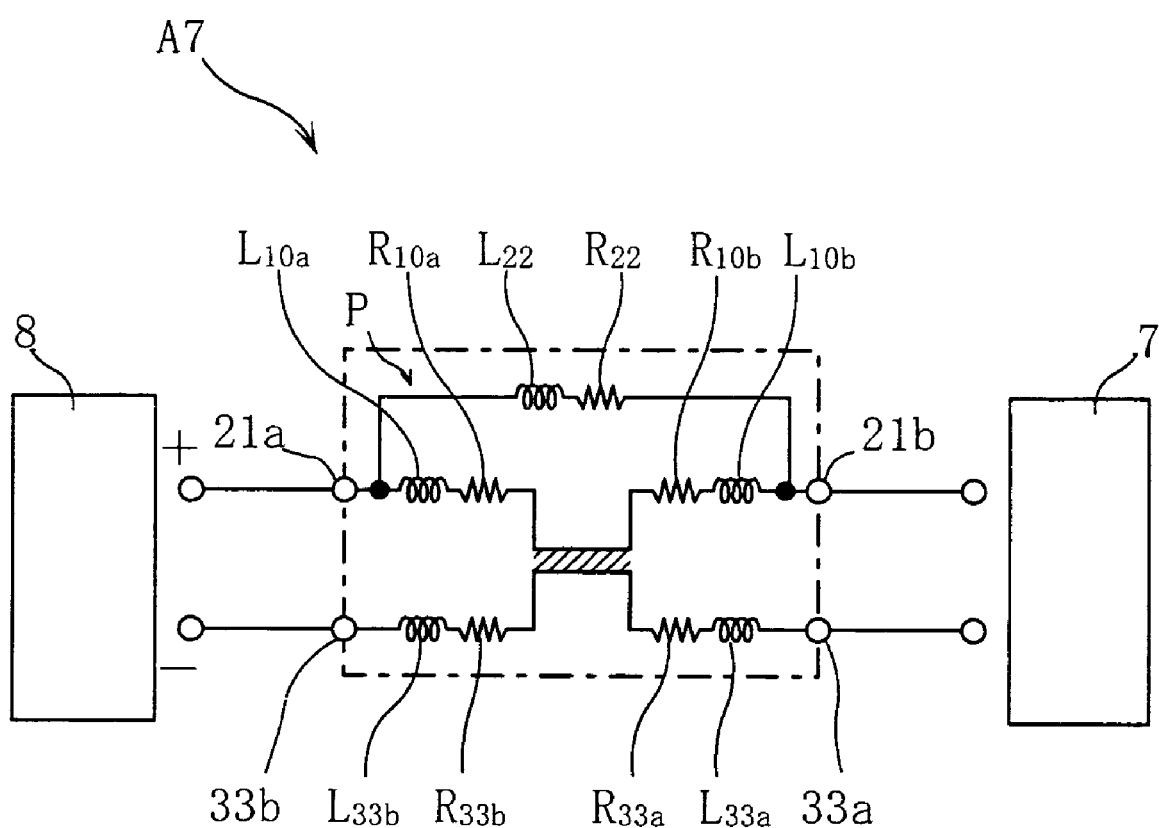
FIG. 22 is a circuit diagram of an example of electric circuit using the solid electrolytic capacitor according to the present invention.

The electric circuit shown in FIG. 22 is similar to that shown in FIG. 4 and made up of a circuit 7, a power supply 8 and a solid electrolytic capacitor A7. The reference signs in this figure are used similarly to those used in FIG. 4. $R_{33a}$, $R_{33b}$ and $L_{33a}$, $L_{33b}$ respectively represent the resistances and inductances of the external cathode terminals 33a, 33b for inputting and outputting. As shown in the figure, the solid electrolytic capacitor A7 is structured as a four-terminal solid electrolytic capacitor by the provision of the external anode terminals 21a, 21b for inputting and outputting and the external cathode terminals 33a, 33b for inputting and outputting. According to this embodiment, following advantages are obtained.

First, description will be given of the instance in which a DC component of the circuit current flows through the solid electrolytic capacitor A7. As noted before, in the illustrated electric circuit, the bypass current path P is formed by the metal cover 22. The resistance $R_{22}$ of the bypass current path P is lower than the equivalent series resistance of the porous sintered body 1 between the anode terminals 11a, 11b for inputting and outputting. Therefore, the DC component is likely to flow through the bypass current path P. As a result, the heat generation at the porous sintered body 1 can be suppressed. Further, the local temperature rise at the joint between the anode wires 10a, 10b and the porous sintered body 1 is advantageously prevented. Moreover, the cracking of the sealing resin 51 can be prevented. The above-described advantages are particularly effective when a large DC component flows due to the inclusion of a HDD in the circuit 7. The lower the resistance $R_{22}$ is, the higher the current which can be dealt with becomes. In this embodiment, the resistance can be easily decreased by increasing the thickness of the metal cover 22, for example.

Next, description will be given of the instance in which an AC component of the circuit current flows through the solid electrolytic capacitor A7. Since the inductance $L_{22}$ of the bypass current path P is higher than the equivalent series inductance between the anode terminals 11a, 11b and the external cathode terminals 33a, 33b, the AC component is likely to flow to the external cathode terminals 33a, 33b through the porous sintered body 1. For instance, the AC component may be a noise included in the circuit current. According to this embodiment, such a noise can be effectively removed from the circuit current. Further, the AC component flowing through the bypass current path P can be attenuated by the inductance $L_{22}$, which is more effective when the frequency is high. It is to be noted that, unlike this embodiment, the bypass current path may be provided by an anode metal plate. The capacitor may include a metal cover electrically connected to the solid electrolytic layer of the porous sintered body.

The solid electrolytic capacitor according to the present invention is not limited to the foregoing embodiments. Specific structures of the parts of the solid electrolytic capacitor according to the present invention may be varied in various ways.

The number, position and shape of anode wires are not limited to the foregoing embodiments and may be varied in various ways. The capacitor is not limited to the structures of the foregoing embodiments and may be structured as a so-called three-terminal type or a feed-through capacitor. Although it is preferable that the metal cover is formed with a hole, the present invention is not limited thereto, and a cover without a hole may be employed.

As the valve metal, tantalum, for example, may be used instead of niobium. Alternatively, an alloy containing niobium or tantalum may be used. The solid electrolytic capacitor is not limited to one which includes a porous sintered body of a valve metal as the anode body but may be an aluminum solid electrolytic capacitor. The application of the solid electrolytic capacitor according to the present invention is not limitative.

The invention claimed is:

1. A solid electrolytic capacitor comprising:
  a porous sintered body of valve metal;
  first and second anode wires partially extending into the porous sintered body, portions of the first and the second anode wires which project out from the porous sintered body serving as first and second anode terminals;
  a cathode including a solid electrolytic layer formed on a surface of the porous sintered body; and
  a conductive member for electrically connecting the first and second anode terminals to each other;
  wherein the first anode wire and the second anode wire extend into the porous sintered body in different directions from each other;
  wherein the conductive member includes a metal cover covering at least part of the porous sintered body; and
  wherein the solid electrolytic capacitor further comprises an insulating member interposed between the metal cover and the cathode.

2. The solid electrolytic capacitor according to claim 1, wherein the direction in which the first anode wire extends and the direction in which the second anode wire extends are opposite from each other.

3. The solid electrolytic capacitor according to claim 1, wherein the porous sintered body is flat.

4. The solid electrolytic capacitor according to claim 3, wherein a plurality of porous sintered bodies are provided; and
  wherein the porous sintered bodies are stacked in a thickness direction of the porous sintered bodies.

5. The solid electrolytic capacitor according to claim 3, wherein a plurality of porous sintered bodies are provided; and
  wherein the porous sintered bodies are arranged side by side in a direction crossing a thickness direction of the porous sintered bodies.

6. The solid electrolytic capacitor according to claim 1, wherein the metal cover is formed with a plurality of holes.

7. The solid electrolytic capacitor according to claim 1, wherein the metal cover is formed with a slit.

8. The solid electrolytic capacitor according to claim 1, wherein the metal cover is formed with a bent portion.

9. The solid electrolytic capacitor according to claim 1, further comprising an external anode terminal for surface mounting which is electrically connected to the first and second anode terminals, and an external cathode terminal for surface mounting which is electrically connected to the cathode.

10. The solid electrolytic capacitor according to claim 1, wherein the insulating member includes a resin film.

11. The solid electrolytic capacitor according to claim 1, wherein the insulating member includes a ceramic plate.

12. The solid electrolytic capacitor according to claim 1, wherein the first and second anode terminals are anode terminals for inputting and outputting which enable circuit current to flow through the porous sintered body; and
wherein the metal cover forms a bypass current path which enables circuit current to flow from the anode terminal for inputting to the anode terminal for outputting while detouring around the porous sintered body.

13. The solid electrolytic capacitor according to claim 12, wherein the bypass current path between the anode terminals for inputting and outputting has resistance which is lower than resistance of the porous sintered body between the anode terminals for inputting and outputting.

14. A solid electrolytic capacitor comprising:
a porous sintered body of valve metal;
first and second anode wires partially extending into the porous sintered body, portions of the first and the second anode wires which project out from the porous sintered body serving as first and second anode terminals;
a cathode including a solid electrolytic layer formed on a surface of the porous sintered body; and
a conductive member for electrically connecting the first and second anode terminals to each other;
wherein the first anode wire and the second anode wire extend into the porous sintered body in different directions from each other;
wherein the conductive member includes an anode metal plate; and
wherein the solid electrolytic capacitor further comprises an insulating member interposed between the anode metal plate and the cathode.

15. The solid electrolytic capacitor according to claim 14, wherein at least part of the anode metal plate serves as an external anode terminal for surface mounting.

16. The solid electrolytic capacitor according to claim 14, wherein the anode metal plate is formed with a slit.

17. The solid electrolytic capacitor according to claim 14, further comprising a cathode metal plate electrically connected to the cathode and interposed between the cathode and the insulating member.

18. The solid electrolytic capacitor according to claim 17, wherein at least part of the cathode metal plate serves as an external cathode terminal for surface mounting.

19. The solid electrolytic capacitor according to claim 14, further comprising a metal cover electrically connected to the cathode and covering at least part of the porous sintered body.

20. The solid electrolytic capacitor according to claim 19, wherein at least part of the metal cover serves as an external cathode terminal for surface mounting.

* * * * *